United States Patent
Xia et al.

(10) Patent No.: US 12,382,498 B2
(45) Date of Patent: Aug. 5, 2025

(54) RESOLVING FAKE COLLISION ISSUE IN FULL DUPLEX COMMUNICATION

(71) Applicants: SONY GROUP CORPORATION, Tokyo (JP); SONY CORPORATION OF AMERICA, New York, NY (US)

(72) Inventors: Qing Xia, San Jose, CA (US); Mohamed Abouelseoud, Burlingame, CA (US); Li-Hsiang Sun, San Jose, CA (US); Liangxiao Xin, Santa Clara, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 429 days.

(21) Appl. No.: 18/064,645

(22) Filed: Dec. 12, 2022

(65) Prior Publication Data
US 2023/0199844 A1    Jun. 22, 2023

Related U.S. Application Data

(60) Provisional application No. 63/265,716, filed on Dec. 20, 2021.

(51) Int. Cl.
*H04W 74/08* (2024.01)
*H04W 74/0816* (2024.01)

(52) U.S. Cl.
CPC .............. *H04W 74/0816* (2013.01)

(58) Field of Classification Search
CPC ................................ H04W 74/0816
See application file for complete search history.

(56) References Cited

U.S. PATENT DOCUMENTS

2020/0154443 A1    5/2020  Patil

FOREIGN PATENT DOCUMENTS

WO    2015009499    1/2015

OTHER PUBLICATIONS

Klein, Alexander, "Preamble-Based Medium Access in Wireless Sensor Networks", https://www.intechopen.com/chapters/38789, Sep. 6, 2012, pp. 1-47.

Liu, Quan et al., "Cooperative control feedback: On backoff misbehavior of CSMA/CA MAC in channel-hopping cognitive radio networks", Journal of Communications and Networks, pp. 1-14, Dec. 2018.

(Continued)

*Primary Examiner* — Walli Z Butt
(74) *Attorney, Agent, or Firm* — O'BANION & RITCHEY LLP; John P. O'Banion

(57) ABSTRACT

A wireless IEEE 802.11 communication protocol under CSMA/CA for enhanced full duplex (FD) station (STA) operations. PPDU preambles are configured to incorporate STA identification and corresponding resource unit (RU) or multiple resource unit (MRU) information. An FD AP indicates STA identification and corresponding RU/MRU index of a transmission destination in the FD preamble of a downlink (DL) PPDU; while a FD non-AP STA indicates its own STA identification and corresponding RU/MRU index in the FD preamble of a uplink (UL) PPDU. The disclosed technology mitigates many issues in regard to fake collisions, partial RU fake collisions, and real collisions, toward improving communications and efficiency and reducing latencies.

18 Claims, 17 Drawing Sheets

(56) References Cited

OTHER PUBLICATIONS

Edward Au (Huawei): "Specification Framework for TGbe", IEEE Draft; 11-19-1262-23-00BE-Specification-Framework-for-TGBE, IEEE-SA Mentor, vol. 802.11 EHT; 802. 11be, No. 23, Jan. 17, 2021 (Jan. 17, 2021), pp. 1-116, Piscataway, NJ USA, XP68175856.
Genadiy Tsodik (Huawei) : "Improving System Efficiency using Full Duplex Based Collision Detection", IEEEdraft; 11-18-1019-01-00FD-Improving-System-Efficiency-Using-Full-Duplex-Based-Collision-Detection, IEEE-SA Mentor , vol. 802.11 FD, No. 1, May 24, 2018 (May 24, 2018), pp. 1-10, Piscataway, NJ USA, XP068126248.

Topology 1

Topology 2

RESOLVING FAKE COLLISION ISSUE IN FULL DUPLEX COMMUNICATION

CROSS-REFERENCE TO RELATED APPLICATIONS

This application claims priority to, and the benefit of, U.S. provisional patent application Ser. No. 63/265,716 filed on Dec. 20, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless local area networks using CSMA/CA with Full Duplex (FD) stations, and more particularly to mechanisms for enhanced handling of fake collisions and real collisions, including partial Resource Unit (RU) collisions.

2. Background Discussion

Full Duplex (FD) operation can provide numerous benefits for increasing communications efficiency in a wireless CSMA/CA network. Since FD devices can simultaneously transmit and receive wireless signals sharing the same frequency resource, it could terminate transmission when it detects a collision. However, there are numerous shortcomings which arise in regard to collisions which appear to be "real", but are actually "fake" collisions. In addition, the processing of real collisions and collisions which arise on only a portion of the resource units (RUs), complicate processing and reduce the attainable efficiency gains.

Accordingly, a need exists for an enhanced wireless communication apparatus/protocol which overcomes these issues, and provides additional benefits as described in the present disclosure.

BRIEF SUMMARY

In current systems capable of Full Duplex (FD) communications there are issues with distinguishing between "fake collisions" and "real collisions"; and thus a station may unnecessarily give up the Transmit Opportunity (TXOP) and discontinue concurrent transmissions based an apparent collision.

The present disclosure describes the passing of additional information and different processing toward overcoming issues with discerning fake collisions, and the processing of real collisions, including partial Resource Unit (RU) collisions. Specifically, received PPDU preambles carry additional STA identification and Resource Unit (RU) and Multi-RU (MRU) information, which are utilized in aiding the processing of these different collision scenarios.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

1. Wireless Communication Using Full Duplex (FD)

Full Duplex (FD) is under discussion in the 802.11 FD TIG. A FD device can simultaneously transmit and receive wireless signals sharing the same frequency resource, which provides the potential to double the spectral efficiency of bi-directional links compared to the use of half-duplex (HD) links. The technology is particularly beneficial for use in Virtual Reality (VR), Augmented Reality (AR), telemedicine and other applications requiring high rate, low latency communications.

One challenge is to efficiently and sufficiently cancel the self-interference (SI) which is transmitted by an FD device and received by the same device through transceiver coupling and multipath reflections.

Collision detection based on FD have been put forth: (a) such as stopping concurrent transmissions from FD devices based on the FD assisted collision detection to avoid wasted time caused by collisions; and (b) FD assisted EDCA access with contention resolution to accelerate collision recovery; and (c) FD assisted CSMA/CA to improve efficiency of existing MAC protocols. Considerations of training and preamble should be considered, such as using a flexible FD preamble to facilitate Self-Interference Cancellation (SIC).

Prioritized communication is found in 802.11 Intra-access category (AC) prioritization which provides six (6) transmit queues that map to four (4) enhanced distributed channel access functions (EDCAFs) to differentiate between traffic streams in the same AC to finer prioritize between AC_VI streams or AC_VO streams.

The priority of traffic streams of different ACs is reflected by the access parameters specified for each AC, which results in a different number of time slots after a SIFS, that the STA needs to defer before either invoking a backoff or starting a transmission.

2. Topology Examples

2.1. Topology 1

Figure 1:
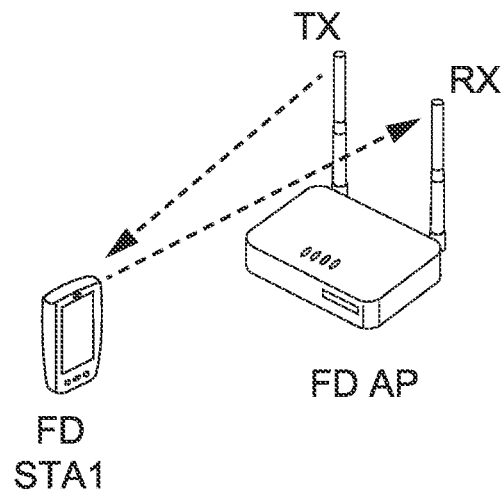
FIG. 1 is a network topology (Topology 1) for use in describing different Full Duplex collision scenarios.

FIG. 1 depicts an AP and STA1 that are both Full Duplex (FD) devices that can transmit and receive at the same time. FD AP is transmitting to FD STA1 and at the same time is receiving from FD STA1. FD STA1 is transmitting to FD AP and at the same time is receiving from FD AP.

2.2. Topology 2

Figure 2:
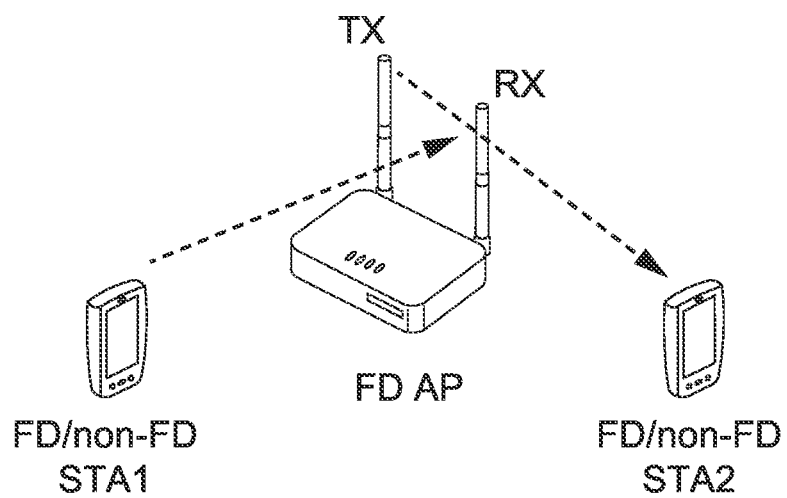
FIG. 2 is another network topology (Topology 2) for use in describing different Full Duplex collision scenarios.

FIG. 2 depicts an AP as a FD device, while STA1 and STA2 can be FD or non-FD devices. STA1 is transmitting to the FD AP and at the same time FD AP is transmitting to STA2. It should be noted that in this proposal, unless somewhere stated, it is assumed that SIC can be successfully achieved.

2.3. Definition of "Fake Collision"

There are different forms of "fake collision" types being considered in this disclosure.

Type 1: the detected interfering PPDU is addressed to the detecting FD device itself. As shown in Topology 1, there is not really a collision since FD STA1 is transmitting to and receiving from the FD AP.

Type 2: overestimated collision detection on another STA. As shown in Topology 2, when FD STA1 and STA2 are out of their communication coverage range. FD STA1 and FD AP both overestimate the collision on STA2 when FD STA1 is transmitting PPDU to FD AP and receiving PPDU from AP to STA2.

Type 3: fake collision in a MU transmission.

Figure 3:
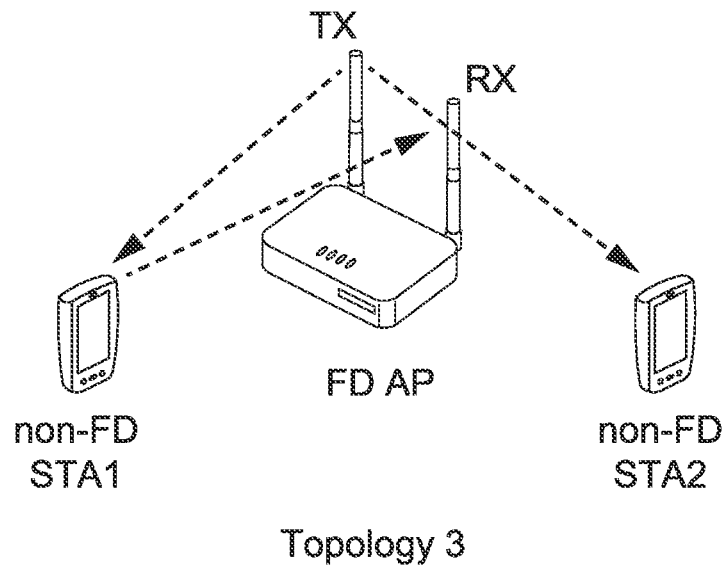
FIG. 3 is another network topology (Topology 3) for use in describing different Full Duplex collision scenarios.

FIG. 3 depicts a Type 3 fake collision in a Multi-User (MU) transmission, which is introduced based on topology 2, which consists of a FD AP and non-FD STA1 and non-FD STA2. It is assumed that STA1 and STA2 are High-Efficiency (HE) STAs.

Figure 4:
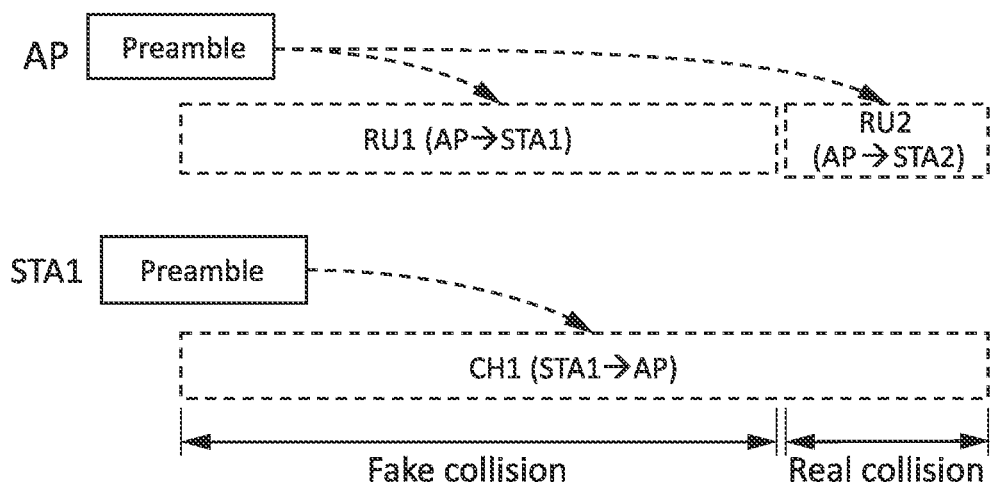
FIG. 4 is a communication diagram depicting a fake collision in some RUs of the transmission.

FIG. 4 depicts a fake collision in some RUs of the transmission. In this example there is a combination of fake and real collisions. STA1 sends HE Single User (SU) Physical Layer Protocol Data Unit (PPDU) to FD AP on a certain channel band (CH1). The Preamble is sent at least on the primary 20 MHz subchannel. The SU PPDU does not carry the STA_ID info in the preamble. The HE SU PPDU carries the bandwidth information, but does not carry Resource Unit (RU) index information.

The FD AP sends a DownLink (DL) HE MU PPDUs to STA1 (RU1) and STA2 (RU2). The Preamble is sent on at least the primary 20 MHz. FD AP which indicates a STA identification (ID) as STA1 with allocated RU1 for the stream to STA1 and indicates STA ID as STA2 with allocated RU2 for the stream to STA2. The FD AP receives the SU PPDU from non-FD STA1 without knowing the STA_ID. Thus, as it seen in the figure, a fake collision occurs on the overlapped RU(s) of RU1 and CH1, with a real collision occurring on the overlapped RU2 and CH1.

3. EHT Device Limitations

Figure 5:
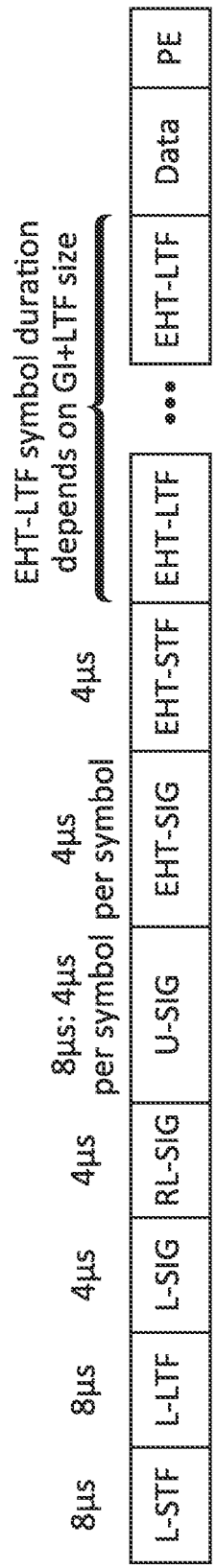
FIG. 5 is a data field diagram of an Extra High Throughput (EHT) SIG field of EHT MU PPDU.

FIG. 5 depicts an Extra High Throughput (EHT) SIG field of EHT MU PPDU. The figure depicts fields including L-STF, L-LTF, L-SIG, RL-SIG, U-SIG, EHT-SIG, EHT-STF, at least one EHT-LTF, Data and a PE.

Figure 6:
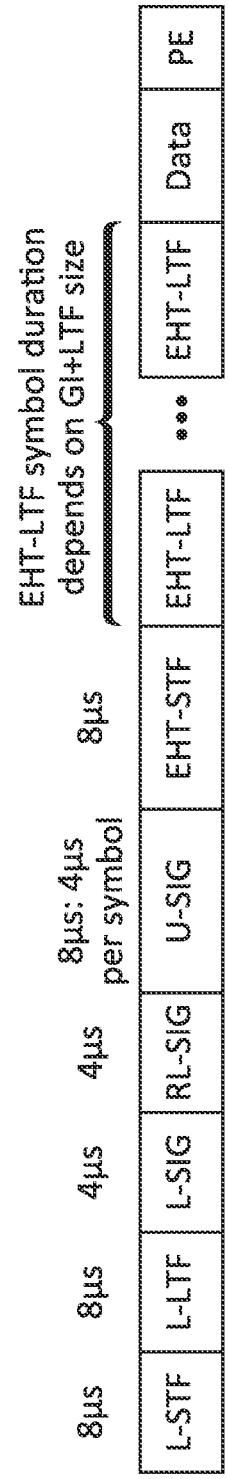
FIG. 6 is a data field diagram of another type of EHT TB PPDU which does not have the EHT-SIG field.

FIG. 6 is another type of EHT TB PPDU which does not have the EHT-SIG field and thus, does not carry STA_ID info in the preamble. The EHT TB PPDU is for UL, while the fake collision issue can only occur in DL PPDU transmissions on the non-AP side. So, the EHT PPDU format does not exhibit the fake collision issue.

The figure depicts fields including L-STF, L-LTF, L-SIG, RL-SIG, U-SIG, EHT-STF, at least one EHT-LTF, Data and a PE.

Figure 7:
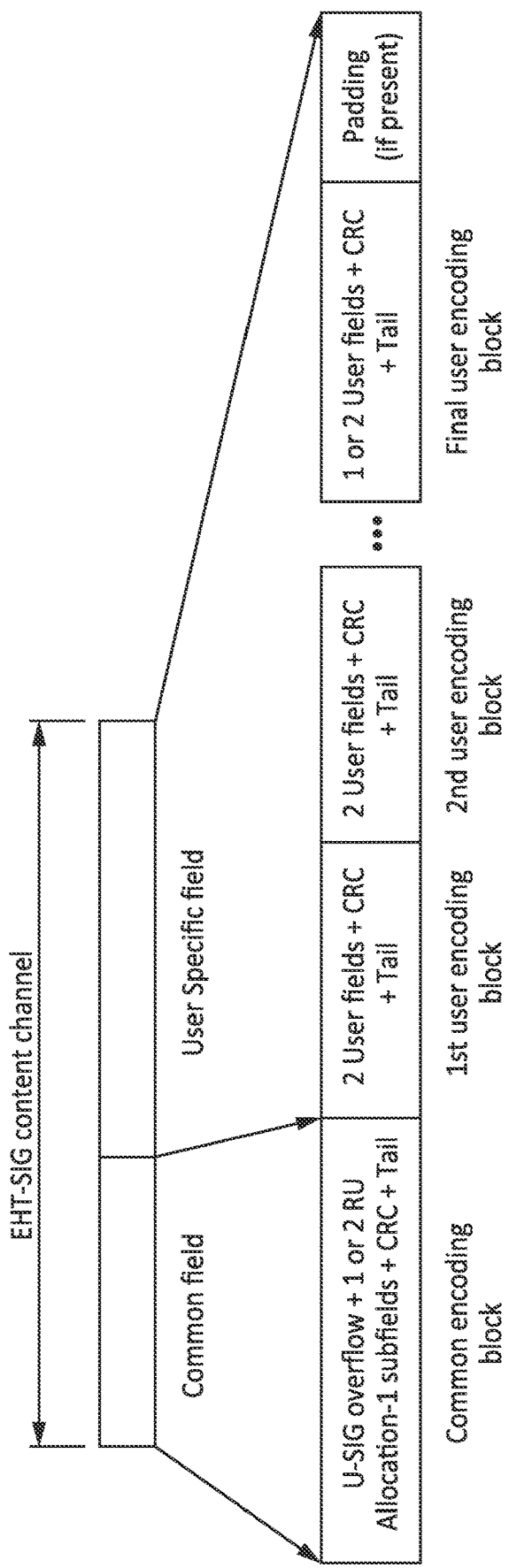
FIG. 7 is a data field diagram of an EHT-SIG specific content channel for EHT devices.

FIG. 7 depicts an EHT-SIG specific content channel for EHT devices, the STA_ID info is only carried in the User Specific subfield of the EHT-SIG field of EHT MU PPDU seen in FIG. 5.

The EHT-SIG content channel is shown as having a Common field and a User Specific field.

The Common field depicts a common encoding block showing a U-SIG overflow+1 or 2 Allocation-1 subfields+CRC+Tail.

The User Specific field depicts a first and second user encoding block which each contain two user fields+CRC+Tail. A Final Encoding Block is depicted with one or two user fields+CRC+Tail. There may also be padding.

The EHT device is capable of switching among different modes, meaning it can transmit PPDU with different format PPDU, such as EHT, HE, VHT, HT, non-HT PPDU. The EHT device can also operate as HE/VHT/HT/non-HT device.

Figure 8:
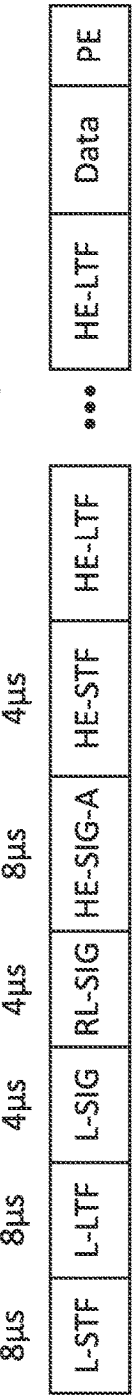
FIG. 8 is a data field diagram of an EHT SIG field for when the EHT device transmits HE SU/ER SU PPDU(s).

FIG. 8 depicts when the EHT device transmits HE SU/ER SU PPDU(s), it does not carry a HE-SIG-B field, thus it does not carry the STA_ID information. The figure depicts fields including L-STF, L-LTF, L-SIG, RL-SIG, HE-SIG-A, HE-STF, at least one HE-LTF (with variable durations per HE LTF symbol), Data and a PE.

During the EHT receive procedure, an EHT device can detect all HE preambles; but during an HE receive procedure, the HE device cannot detect the U-SIG of EHT preambles.

4. Limitation of Current Technology

The EHT device does not always carry STA_ID information in certain circumstances when it transmits HE SU/ER SU PPDU(s). However, the FD PPDU should have STA_ID info in the preamble in all circumstances (i.e., SU/ER SU/MU transmission).

5. Problem Statement and Innovation

A transmitting FD device cannot distinguish the "fake collisions" from the real collision and may unnecessarily give up the TXOP and stop the concurrent transmissions based on a received preamble.

Thus, one of the goals of the present disclosure is to allow the FD STA to recognize a fake collision upon receiving a preamble, whereby it can avoid unnecessary termination of the TXOP. The received preamble should carry STA_ID information and the corresponding RU/MRU info, so that the detecting STA can determine if the PPDU of the received preamble is addressed to itself or not. A new FD preamble-based collision detection protocol is described to to resolve fake collisions, and otherwise enhance collision processing.

5. Hardware Embodiments

5.1. Analog and Digital SIC

Figure 9:
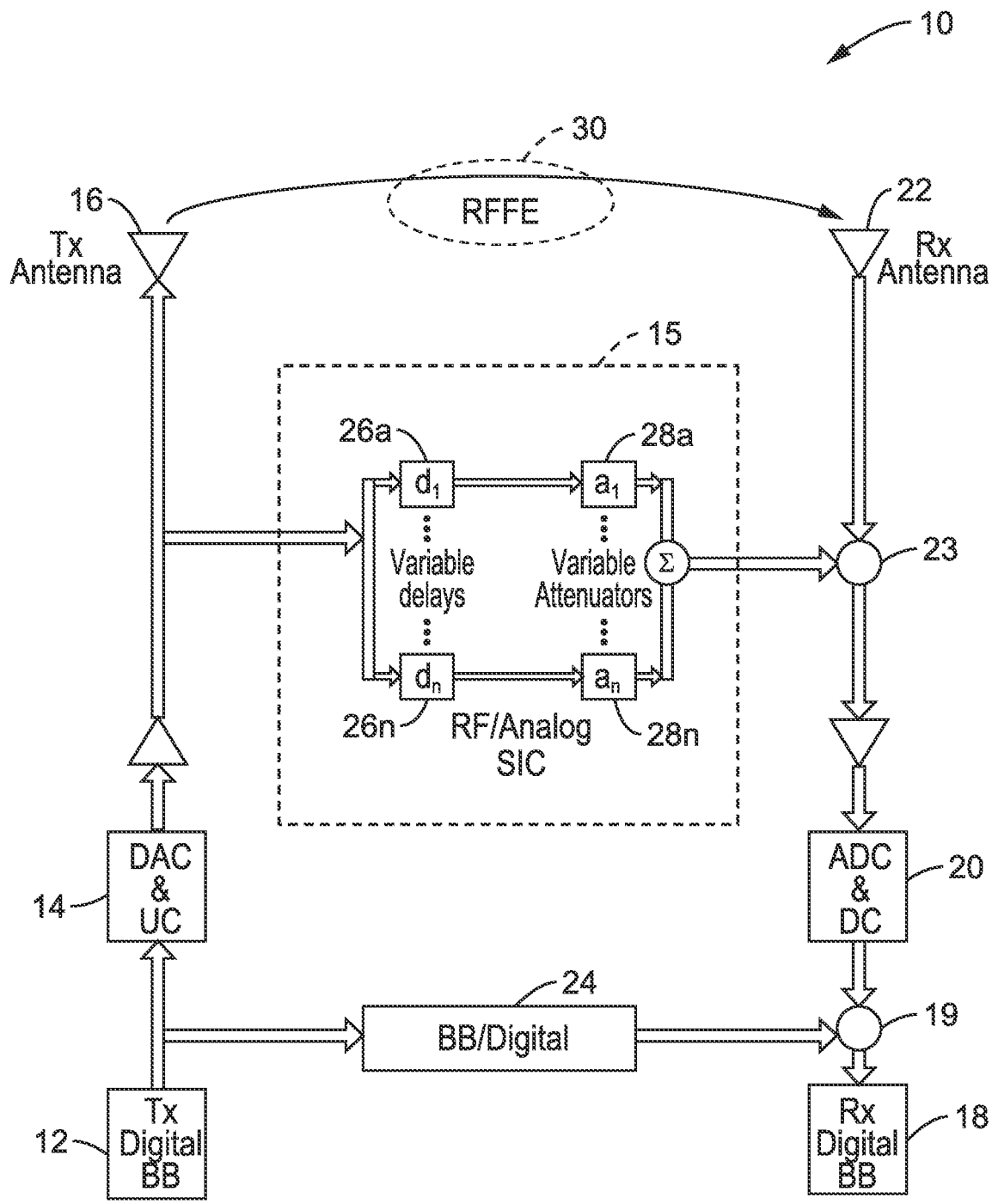
FIG. 9 is a block diagram of full duplex transceiver with analog and digital SIC, showing that between each pair of Tx chain and Rx chain, there are RF/analog Self-Interference-Cancellation (SIC) and baseband/digital SIC elements, according to at least one embodiment of the present disclosure.

FIG. 9 illustrates an example embodiment 10 of a full-duplex (FD) transceiver with analog digital SIC. A Tx Digital BB is the baseband transmit signal. The baseband digital signal accumulates harmonics and transmitter noises after the modulation of Digital-to-Analog Converter (DAC) and up converter (UC) to the passband signal. Before the transmitted signal goes to the Tx antenna, a small copy of the transmitted signal which includes the transmitter noise has been passed through a circuit to do Analog SIC. The circuit consists of parallel fixed lines of varying delays and tunable attenuators. These lines are then collected and added up, and this combined signal is then subtracted from the signal on the receive path. Then the received passband signal passes through an analog to digital converter (ADC) and down converter (DC).

A digital SIC on baseband is applied to the baseband digital signal to estimate the remaining residual self-interference, which includes the main transmit SI after analog cancellation and any delayed reflections of this signal from the environment.

More particularly the (SIC) hardware is as utilized in a station having a Radio Frequency Front End (RFFE) 30. This SIC hardware is utilized in wireless local area networks (WLANs), such as the STA seen below in FIG. 10.

The Tx Digital BB 12 is the baseband Transmit (TX) signal. The baseband digital signal accumulates harmonics and transmitter noises through modulation of the Digital-to-Analog converter (DAC) and upconverter (UC) 14 to a passband signal. Before the transmitted signal goes to TX antenna 16, a small portion of the transmitted signal, which includes the transmitter noise, is passed through circuit 15 to do Analog SIC.

The SIC circuit consists of parallel fixed lines of varying delays 26a through 26n and tunable attenuators 28a through 28n. These lines are then collected and added up, and this combined signal is then subtracted 23 from the signal on the receive path.

The passband signal received from antenna 22, has SIC correction applied 23, and passes through analog to digital converter (ADC) and down converter (DC) 20. A digital SIC 24 is applied 19 to the baseband digital signal from the ADC and DC, to estimate the remaining residual self-interference, which includes the main TX SI after analog cancellation and any delayed reflections of this signal from the environment, to produce receiver digital baseband signal 18.

5.2. Communication Station Hardware

Figure 10:
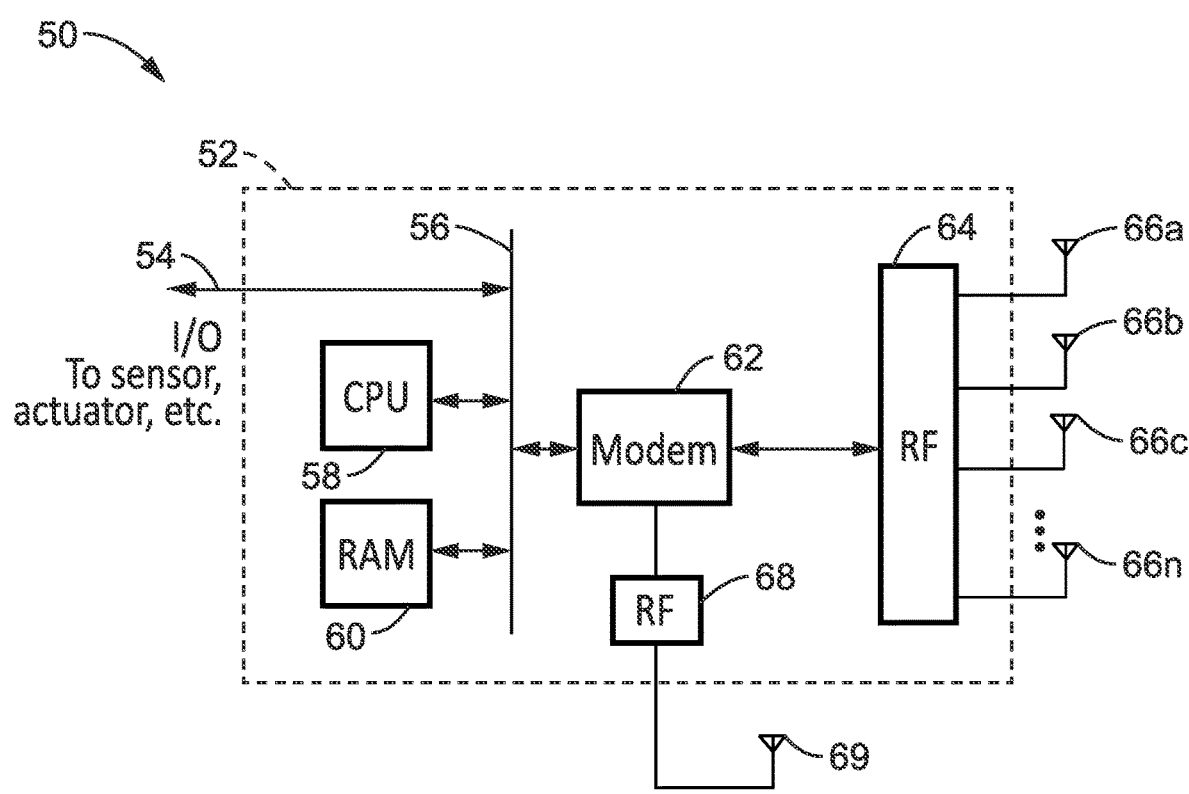
FIG. 10 is a hardware block diagram of wireless station (STA) hardware, according to at least one embodiment of the present disclosure.

FIG. 10 illustrates an example embodiment 50 of STA hardware configured for executing the protocol of the present disclosure. An external I/O connection 54 preferably couples to an internal bus 56 of circuitry 52 upon which are connected a CPU 58 and memory (e.g., RAM) 60 for executing a program(s) which implements the described communication protocol. The host machine accommodates at least one modem 62 to support communications coupled to at least one RF module 64, 68 each connected to one or multiple antennas 69, 66a, 66b, 66c through 66n. An RF module with multiple antennas (e.g., antenna array) allows for performing beamforming during transmission and reception. In this way, the STA can transmit signals using multiple sets of beam patterns.

Bus 54 allows connecting various devices to the CPU, such as to sensors, actuators and so forth. Instructions from memory 60 are executed on processor 58 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, non-AP stations, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 62, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

6. Protocol Design

6.1. Resolving Fake and/or Real Collision w/FD Preamble

The FD AP shall indicate the STA_ID and the corresponding RU/MRU index of the destination in the FD preamble of the DL PPDU. The FD AP detects the "fake collision" when it transmits and receives at the same time after SIC and detects from the received UL FD preamble the same STA_ID as the STA_ID in its transmitted DL FD preamble. In response, the FD AP can continue transmitting (e.g., should not stop transmitting) the remaining portion of the DL PPDU after detecting the "fake collision".

The FD AP detects a "partial RU fake collision" and stops transmitting the remainder of the PPDU and retransmits the preamble. The new preamble indicates if it maintains the original RU allocation or uses a new RU allocation to avoid the fake collision. The FD AP detects a "partial RU fake collision" when it transmits and receives at the same time after SIC and detects from the received UL FD preamble that indicates the same STA_ID as the STA_ID in its transmitted DL FD preamble, but indicates a RU/MRU index that has the same subset as the RU/MRU index in its transmitted DL FD preamble FD AP detect the "real collision" when it transmits and receives at the same time after SIC and detects from the received UL FD preamble that indicates the different STA_ID as the STA_ID in its transmitted DL FD preamble.

Methodology 1: FD AP retransmits the PPDU without the need to check collision status: (1) If the FD AP detects a "real collision" it should immediately stop transmitting the rest of the DL PPDU. (2) If the FD AP detects a "real collision" it should retransmit the PPDU once the colliding preamble has been terminated and the AP doesn't receive any signaling from the destination non-AP STA.

Methodology 2: FD AP requests to check the collision status in the preamble and retransmits the PPDU when it is known the collision is not real. (1) If the FD AP detects a "real collision", it should immediately stop transmitting the remainder of the DL PPDU. (2) The FD AP may set a check bit in the FD preamble to request the destination DL STA to send a signal the collision status as the response of the received FD preamble. (3) If FD AP receives signaling from the DL destination STA which indicates there is no collision on that STA, then it may resume transmission of the remainder of the PPDU, may determine to duplicate, or not duplicate, the transmission of the preamble.

A FD non-AP STA shall indicate its own STA_ID and the corresponding RU/MRU index in the FD preamble of UL PPDU. A FD non-AP STA detects a "fake collision" when it transmits and receives at the same time after SIC and detects from the received DL FD preamble the same STA_ID as the STA_ID in its transmitted UL FD preamble. The FD non-AP STA detecting the "fake collision" shall continue transmitting the remainder of the PPDU to the FD AP.

A FD non-AP STA which detects a "partial RU fake collision" stops transmitting the remainder of the PPDU and retransmits the preamble. The non-AP STA should retransmit a new preamble after finishing receiving the Preamble from the AP to avoid a real collision on the other STA which is the destination of the AP preamble. The new preamble sent by the non-AP STA indicates if the non-AP STA maintains, or re-allocates, the RU(s) to transmit the remainder of the PPDU to resolve fake collisions. It should be noted that transmission of the new preamble is required to use at least the primary 20 MHz channel and should not interfere with reception at other non-AP STAs.

A FD non-AP STA detects a "real collision" when it transmits and receives at the same time after SIC, and detects from the received DL FD preamble a different STA_ID than the STA_ID in its transmitted UL FD preamble. The FD non-AP STA detecting a "real collision" immediately discontinues (stops) transmission. If the FD non-AP STA receives an AP preamble containing a check bit setup, but it does not receive any signal from the destination of the AP that indicates a collision; and if the FD non-AP STA received indication that the AP has resumed retransmission of the PPDU, then the FD non-AP STA can recognize (understand) that no collision has occurred on the destination of AP. In this case, the FD non-AP STA may resume retransmitting the PPDU. It is necessary when resuming PPDU transmission, the resumed PPDU addressed to the AP should make its end point align with the transmission of the concurrent PPDU from the AP to another non-AP STA.

The FD STA (not transmitting) that receives corrupted preambles should not respond. Otherwise, if the FD STA successfully receives DL FD preamble with a STA_ID addressed to itself and detects a check bit is setup, it should respond to the associated AP to indicate if it has successfully received the FD preamble from the AP.

6.2. Process Flow Diagrams

Figure 11:
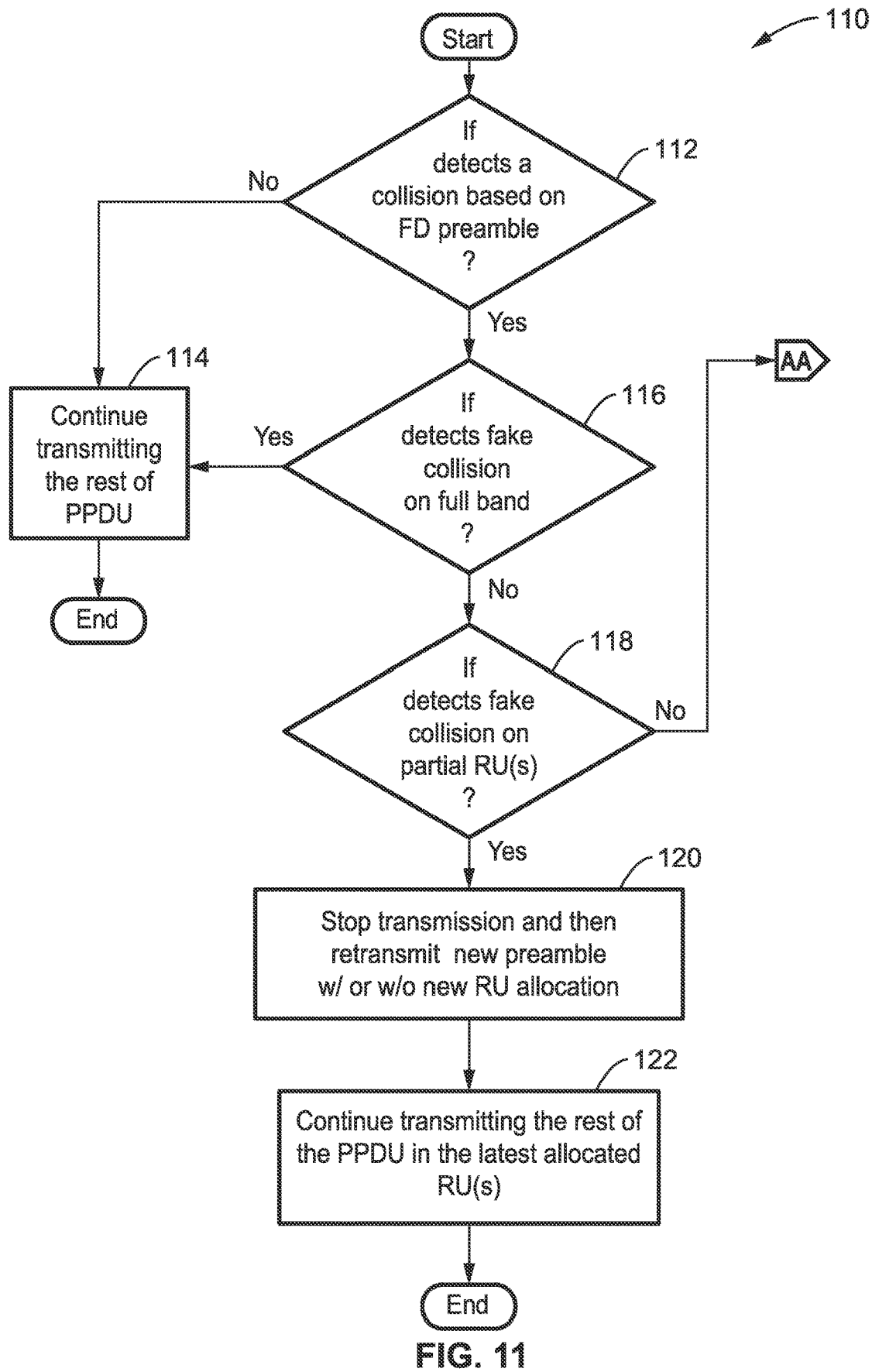
FIG. 11 and FIG. 12 is a flow diagram of an FD operation on the AP side of communications, according to at least one embodiment of the present disclosure.
Figure 12:
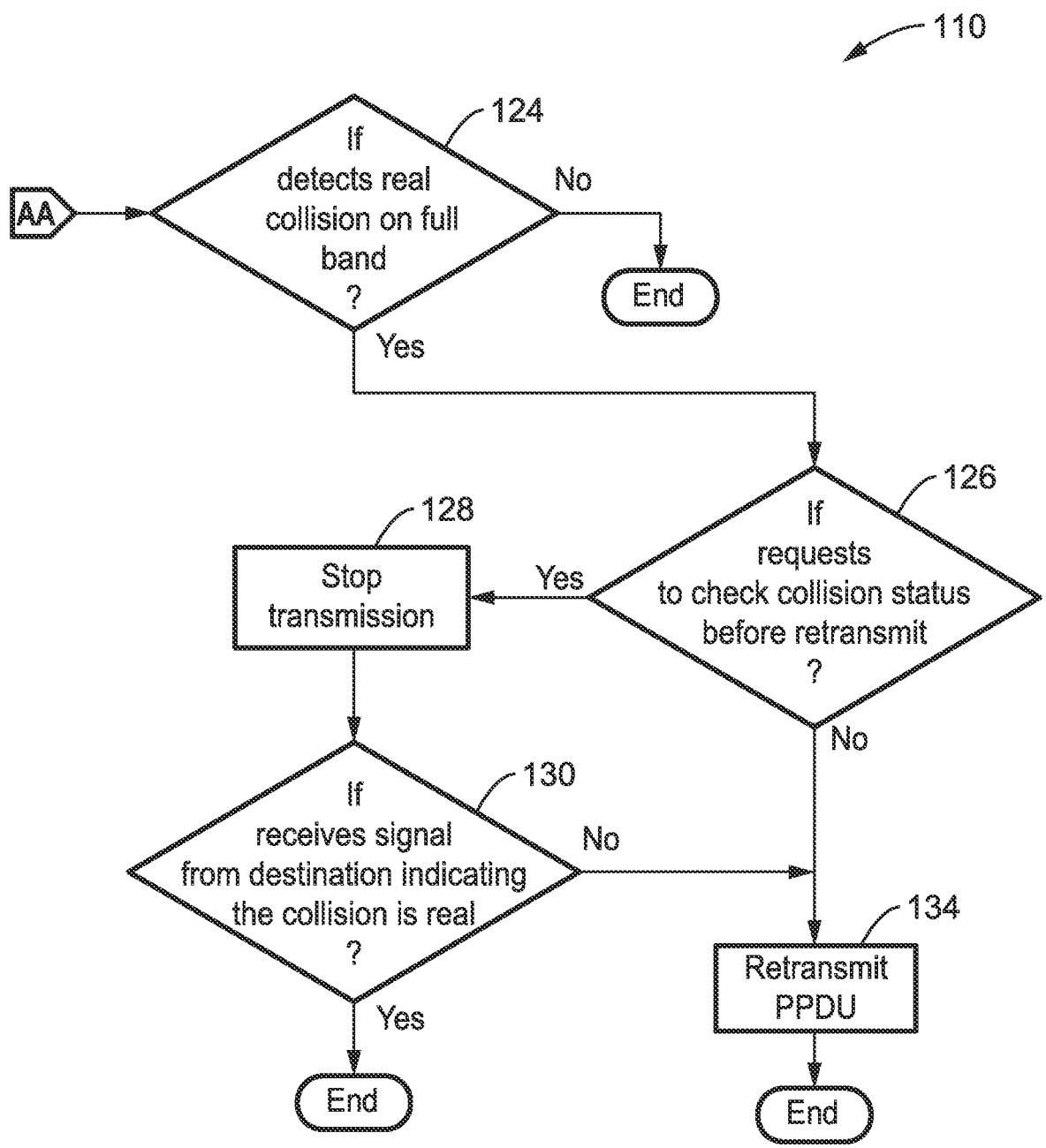

FIG. 11 and FIG. 12 illustrate an example embodiment 110 of an FD operation on the AP side of the communications. Check 112 determines if a collision has been detected based on the FD preamble. If the condition is not met, then at block 114 the AP continues transmitting the remainder of the PPDU and this processing ends. Otherwise, at block 116 a check determines if a fake collision was detected on the full band.

If a fake collision was detected on the full band at check 116, then execution moves to block 114, which was already described. Otherwise, at check 118 it is determined if a fake collision occurred on partial RU(s). If this condition is met, then at block 120 the AP discontinues transmission and starts retransmitting a new preamble with, or without, a new RU allocation.

At block 122, the AP continues transmitting the remainder of the PPDU in the latest located RU(s). Returning to reconsider check 118 when the condition of detecting a fake collision on partial RU(s) is not met, then execution reaches check 124 of FIG. 12 which determines if a real collision has occurred on the full band. If the condition is not met, then this processing ends.

Otherwise, at check 126 the AP determines if there is a request to check collision status before it retransmits. If the condition is not met, then the AP retransmits 134 the PPDU. Otherwise, at block 128 the AP stops transmission and at check 130 it is determined if a signal has been received from the destination indicating that the collision is real. If the condition is not met, then the AP retransmits 134 the PPDU. Otherwise, if the condition is met then processing ends.

Figure 13:
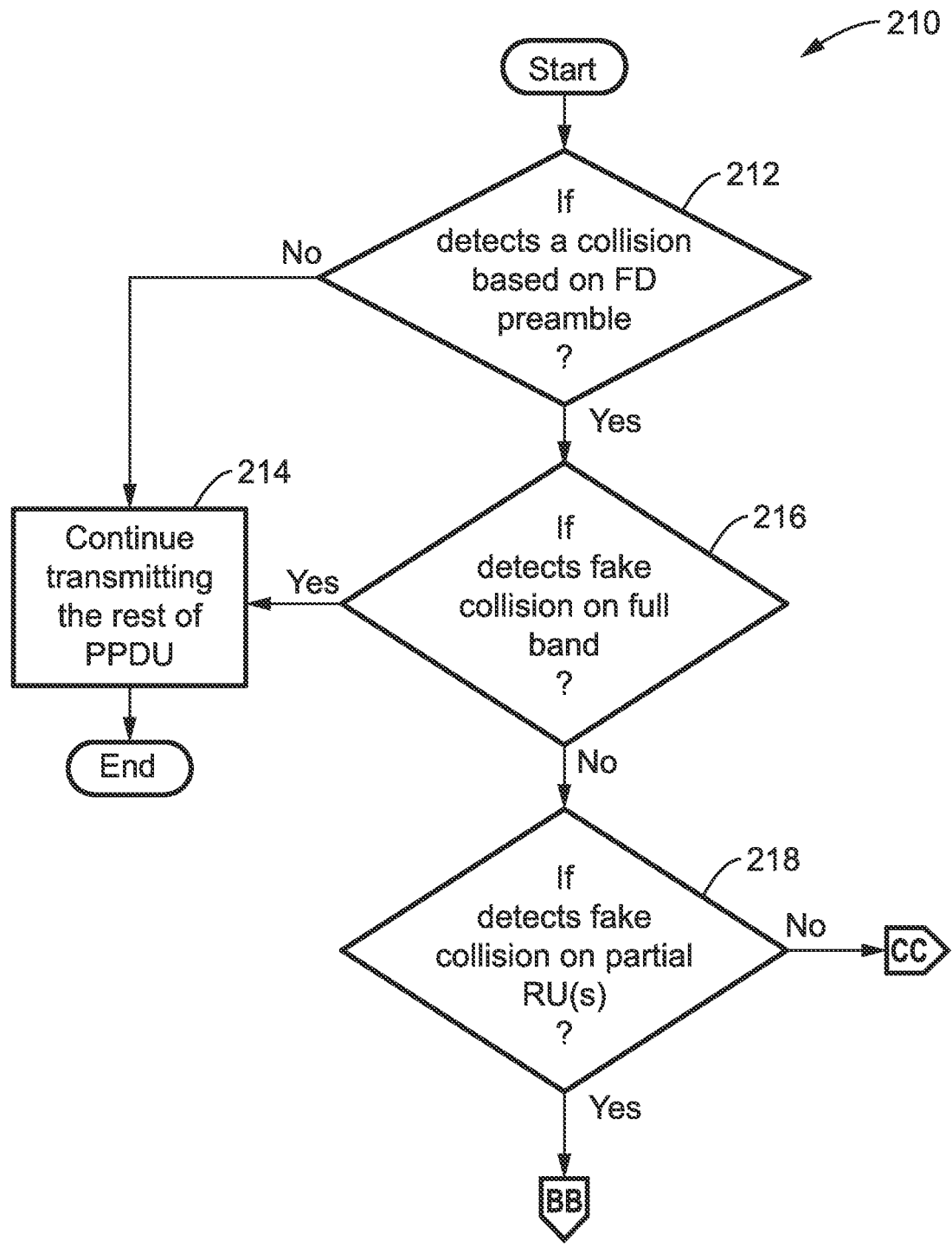
FIG. 13 through FIG. 15 is a flow diagram of FD operation from the non-AP side, according to at least one embodiment of the present disclosure.
Figure 14:
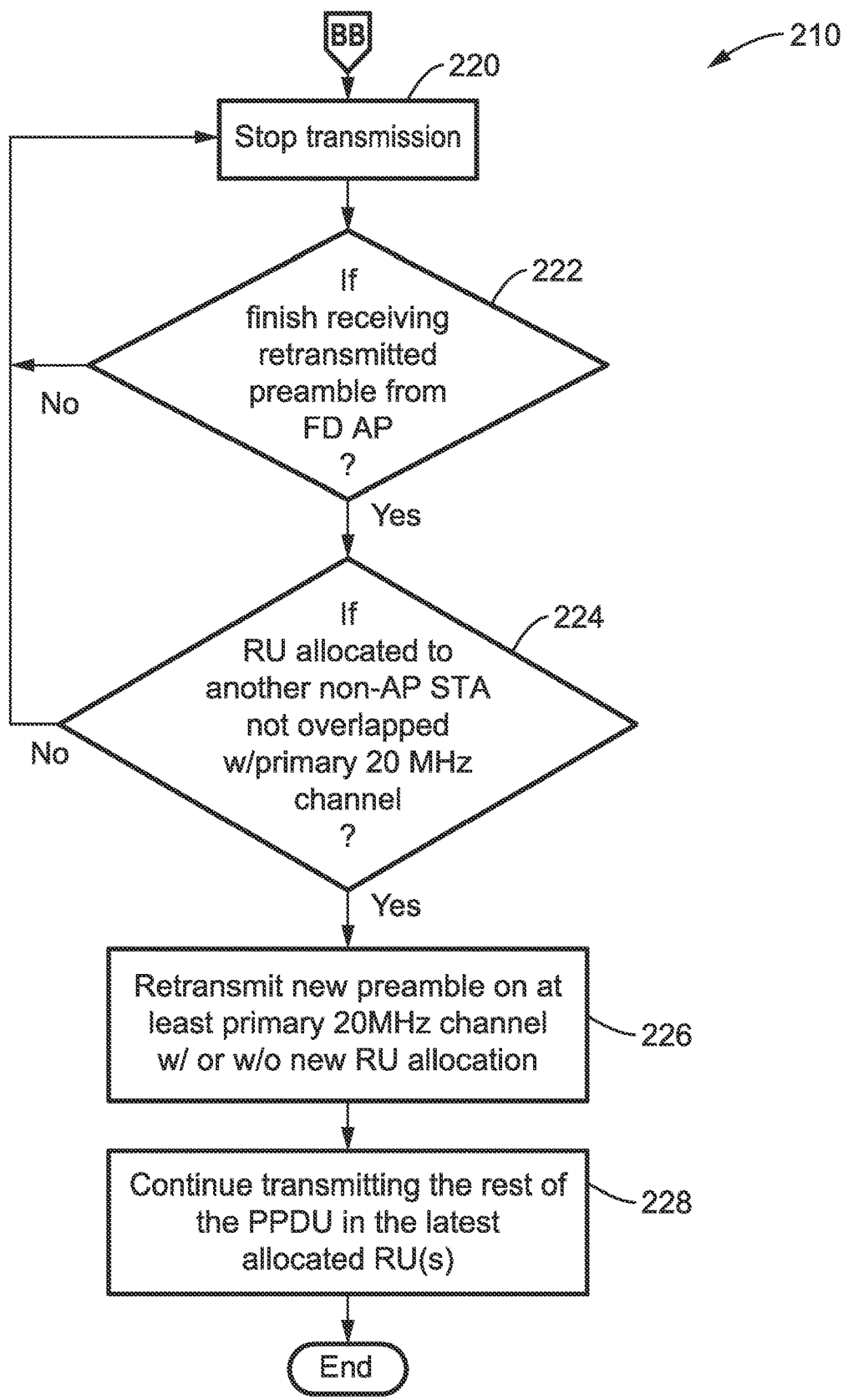
Figure 15:
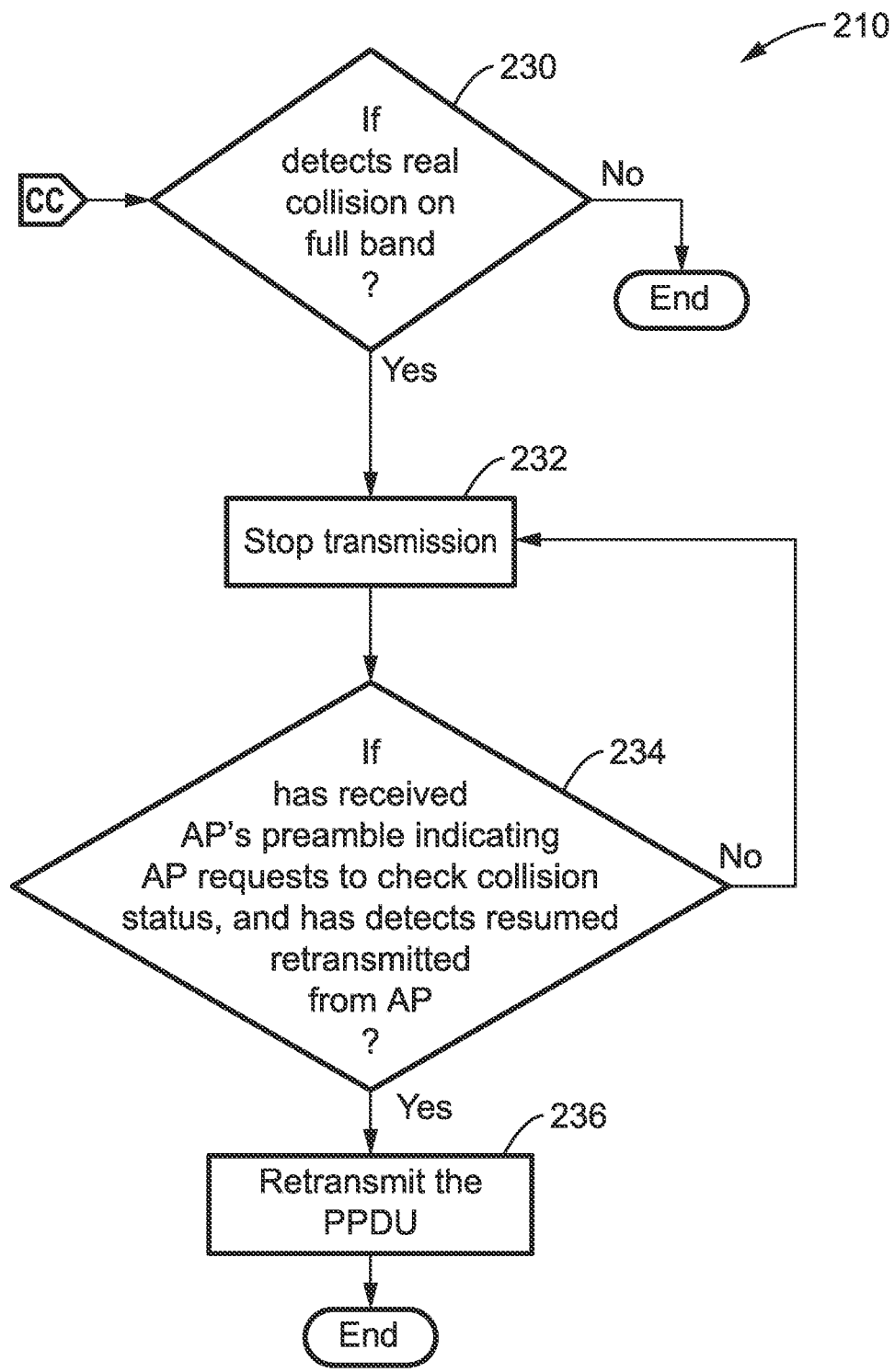

FIG. 13 through FIG. 15 illustrate an example embodiment 210 of FD operation from the non-AP side. Check 212 of FIG. 13 determines if a collision was detected based on information from the FD preamble. If no collision was indicated, then at block 214 the non-AP continues transmitting the remainder of the PPDU. Otherwise, with a collision detected, execution reaches check 216 which determines if there was a fake collision on the full band. If this condition is met, then at block 214 the non-AP continues transmitting the remainder of the PPDU. Otherwise, with no fake collision detected, then check 218 is reached which determines if a fake collision was detected on partial RU(s).

If a fake collision was detected on partial RU(s), then at block 220 in FIG. 14 the non-AP discontinues (stops) transmission and check 222 determines if the non-AP STA has finished receiving the retransmitted preamble from the FD AP. If the condition is not met, then execution returns to block 220.

Otherwise, at block 224 it is determined if RU(s) are allocated to another non-AP STA which does not overlap the primary 20 MHz channel. If the condition is not met, then execution also returns to block 220.

With both conditions being met in checks 222 and 224, execution reaches block 226 in which the non-AP STA retransmits a new preamble on at least the primary 20 MHz channel with, or without, a new RU allocation. Then at block 228, the non-AP STA continues transmitting the remainder of the PPDU in the latest allocated RUs.

Returning now to consider check 216 in FIG. 13 when the non-AP STA has not detected a fake collision on partial RU(s), whereby execution reaches check 230 of FIG. 15 which determines if the non-AP STA has detected a real collision on the full band. If a real collision is not detected, then this processing stops.

Otherwise, with a real collision detected on the full band, then at block 232 the non-AP STA stops transmitting, and at check 234 it is determined if the non-AP STA has received a preamble from the AP which indicates that the AP requests a check on collision status, and has detected resumed transmissions from the AP. If the condition is not met, then execution returns to block 232. Otherwise, at block 236 the non-AP STA retransmits the PPDU.

6.3. FD Preamble

Figures 16, 17:
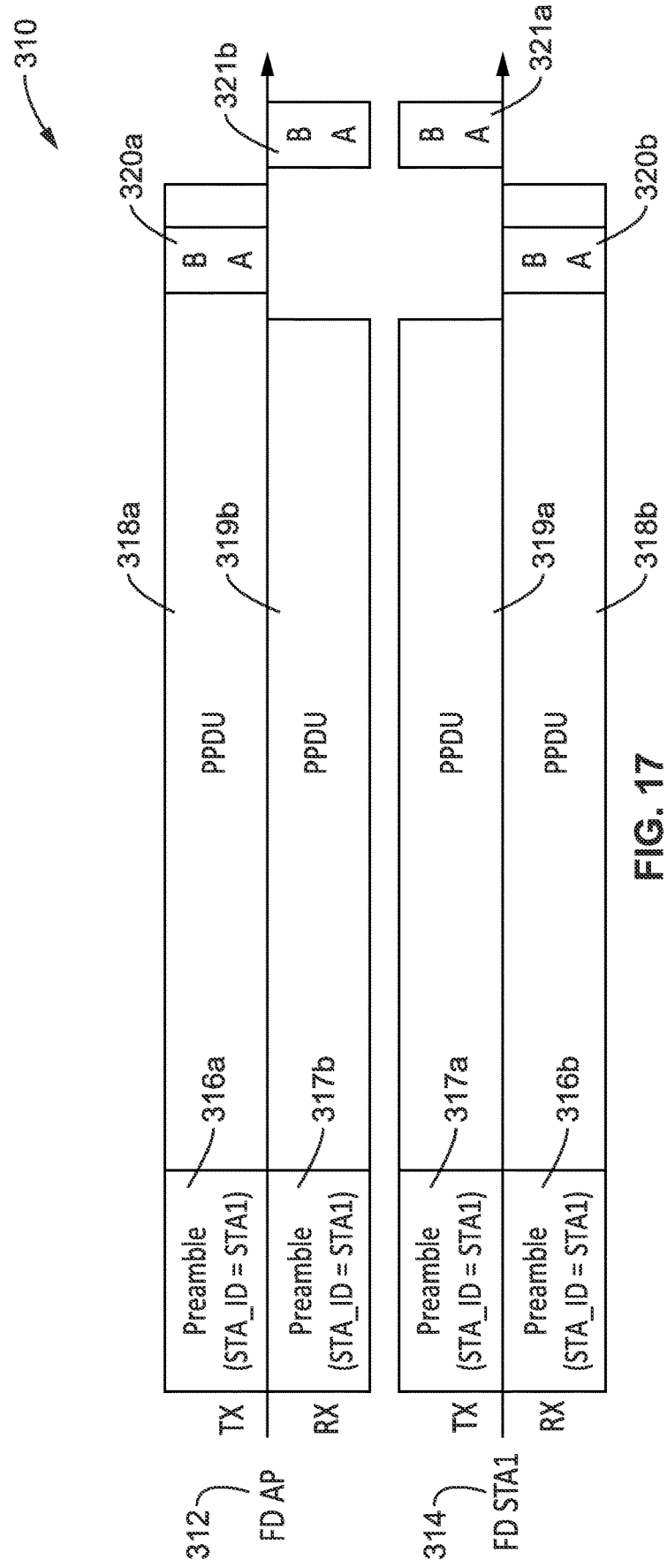
FIG. 16 is a data flow diagram of a FD preamble which may include pre-FD modulated fields and/or FD modulated fields, according to at least one embodiment of the present disclosure.
FIG. 17 is a communication diagram of resolving a fake collision for Topology 1, according to at least one embodiment of the present disclosure.

FIG. 16 illustrates an example embodiment 270 of a FD preamble which may include pre-FD modulated fields and/or FD modulated fields. The pre-FD modulated fields may contain L-STF, L-LTF, L-SIG, or similar. The FD modulated fields may contain FD-SIG, FD-STF, FD-LTF, of similar.

The FD-SIG field carries information necessary to interpret the FD SU/MU PPDU. It will be noted that the reference of U-SIG (802.11be_D2.2) is designed to bring forward compatibility to the EHT preamble. FD-SIG design carries most fields from U-SIG field of an EHT MU PPDU. In addition, two additional fields are added as "STA_ID" and "RU Allocation" specifically for the collision detection and resolution as discussed in this disclosure. This may contain subfields such as follows. A BW subfield which indicates the bandwidth for the FD device operation. A UL/DL subfield which indicates whether the PPDU is sent in UL or DL. This subfield for example can be set to a first state (e.g., "1") if the PPDU is addressed to an AP; and otherwise set to a second state (e.g., "0"). A BSS Color subfield identifying the BSS. A TXOP subfield which indicates the duration information for NAV setting and the protection of TXOP. A PPDU Type subfield which indicates the type of PPDU, such as OFDMA or Non-OFDMA, SU PPDU or MU PPDU, and so forth. A Punctured Channel Information subfield which indicates the puncturing pattern of the 20 MHz subchannel(s) of the bandwidth as defined in BW. A FD-SIG MCS subfield which indicates the MCS used for modulating the FD-SIG. A FD-PPDU-MCS subfield which indicates the MCS used for modulating the remainder of the FD PPDU. A STA_ID subfield which is set for the source STA_ID if the UL flag is on, or to the destination STA_ID if the DL flag is on. A RU Allocation subfield which indicates the RU/MRU that is allocated to the user for OFDMA transmission. A CRC (Cyclic Redundancy Check) subfield for the FD-SIG field. A Tail subfield which is used to terminate the trellis of the convolutional decoder.

6.4. Operational Examples 6.4.1. Example 1—Overcoming Fake Collision

FIG. 17 illustrates an example embodiment 310 of resolving a fake collision for Topology 1 as seen in FIG. 1. FD AP 312 is transmitting a DL PPDU 318a to FD STA1 314 with setting STA_ID=STA1 in the FD preamble 316a. In this and the following figures, it will be noted that both the transmitted and received (preamble, PPDU, BA, and the like) are numbered; for example, preamble 316a is transmitted and preamble 316b is the same preamble, but as received.

FD STA1 is transmitting UL PPDU 319a to FD AP with setting STA_ID=STA1 in the FD preamble 317a. FD AP receives the UL (UL/DL is 1) FD preamble 317b with STA_ID indicating that the FD PPDU 319b is from STA1. AP recognizes the presence of the "fake collision" and thus should continue transmitting the remainder of the PPDU to the FD STA1. FD STA1 receives the DL (UL/DL is 0) FD preamble 316b with STA_ID indicates the FD PPDU 318b is addressed to it. FD STA1 recognizes the "fake collision" and thus should continue transmitting the remainder of the PPDU to the FD AP. The length of PPDUs from FD AP and FD STA1 do not have to be the same duration.

As shown in this example, after the PPDU is sent from STA1, then STA1 will expect a BA 320b from the AP. The BA 320a can be embedded in the PPDU that the AP is transmitting to STA1. Then after the AP finishes the transmission of DL PPDU to STA1, STA1 responds with BA 321a which is received as BA 321b by the AP.

6.4.2. Example 2—Real Collision Improvement

Figure 18:
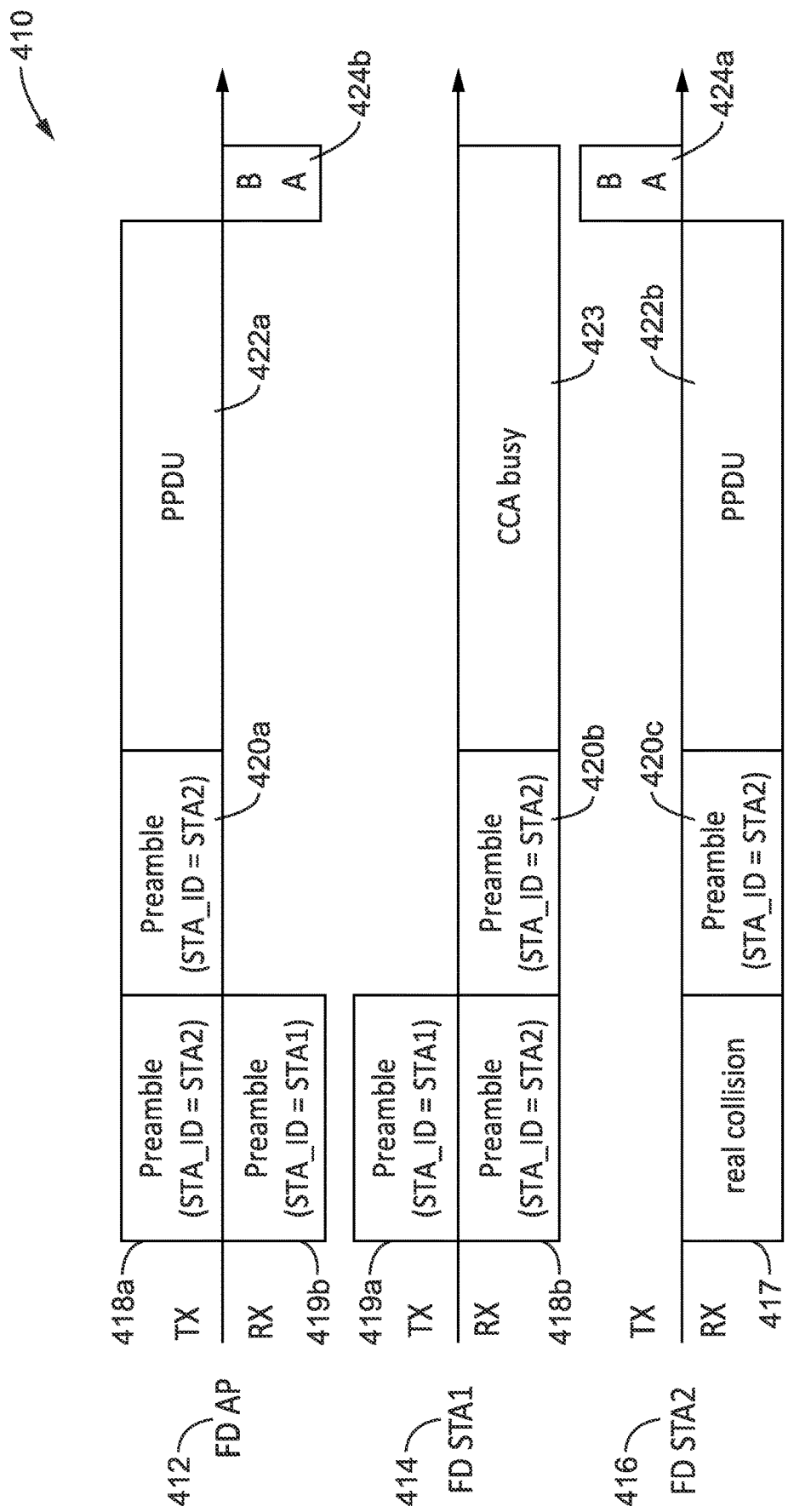
FIG. 18 is a communication diagram of improving a real collision handling for Topology 2, according to at least one embodiment of the present disclosure.

FIG. 18 illustrates an example embodiment 410 of improving the handling of a real collision, with the example based on topology 2. The AP 412 and STA1 414 are FD devices and STA2 416 can be either a FD or non-FD device. AP, STA1 and STA2 are within the communication range of each other.

FD AP is transmitting a DL (UL/DL=0) PPDU 422a to STA2 with indicating STA_ID=STA2 in the FD preamble 418a. FD STA1 is transmitting UL (UL/DL=1) PPDU to AP indicating STA_ID=STA1 in the FD preamble 419a. FD STA1 receives the FD preamble 418b from the AP which indicates that STA_ID=STA2, and recognizes there must have arisen a collision on STA2, as a result of which it immediately stops transmission. FD STA2 having received corrupted preambles 417, should not respond. The FD AP receives the FD preamble 419b from STA1 indicating STA_ID=STA1, and recognizes there is likely a real collision on STA2.

The AP may retransmit the PPDU to STA2 once the received preamble has been terminated and the AP does not receive any signaling from the destination STA2 which indicates it has successfully received the FD preamble from the AP.

The AP sends new FD preamble 420a, which is received 420b at STA1, and 420c at STA2. The preamble indicates PPDU 422a is addressed to STA2, and should set the NAV value based on the TXOP information contained in the FD preamble. Then STA2 finishes reception of the FD PPDU 422b from the AP, while FD STA1 is CCA busy 423. FD STA2 responds with a BA 424a which is received 424b at the AP.

6.4.3. Example 3—Overestimated Collision Improvement

Example 3 uses the same collision protection protocol as that in Example 2, and the same as in FIG. 18. This example is based on topology 2 as introduced before. More specifically, the AP and STA1 are FD devices and STA2 can be either FD or a non-FD device. In this example it is assumed that STA1 and STA2 are NOT within communication range of each other.

Referring to FIG. 18, the FD AP is transmitting a DL (UL/DL=0) PPDU to STA2 and indicates STA_ID=STA2 in the transmitted FD preamble 418a. FD STA1 is transmitting UL (UL/DL=1) PPDU to the AP indicating STA_ID=STA1 in the FD preamble 419a. FD STA1 receives the FD preamble 418b from the AP indicating STA_ID=STA2, and recognizes there is likely a collision on STA2, whereby it immediately discontinues (stops) transmission. FD STA2 receives corrupted preambles 417 and should not respond. The corruption is between the preamble 418a sent by the AP and interferences from intra BSS or OBSS, instead of the preamble 419a sent by STA1.

The FD AP receives the FD preamble 419b from STA1 indicating STA_ID=STA1, and recognizes there appears to be a real collision on STA2. The AP may retransmit the PPDU to STA2 once the received preamble has been terminated if the AP hasn't received any signaling from destination STA2 indicating it has successfully received the FD preamble from the AP.

The AP sends new FD preamble 420a, which is received 420b by STA1 indicating the PPDU is addressed to STA2, and should set the NAV value based on the TXOP information contained in the FD preamble. The AP has transmitted PPDU 422a, and STA2 finishes reception of the FD PPDU 422b from AP, during which time STA1 receive side is CCA busy. Then STA2 responds to receipt of PPDU 422b with a BA 424a, which is received 424b by the AP.

6.4.4. Example 4—Overestimated Collision Improvement w/Check

Figure 19:
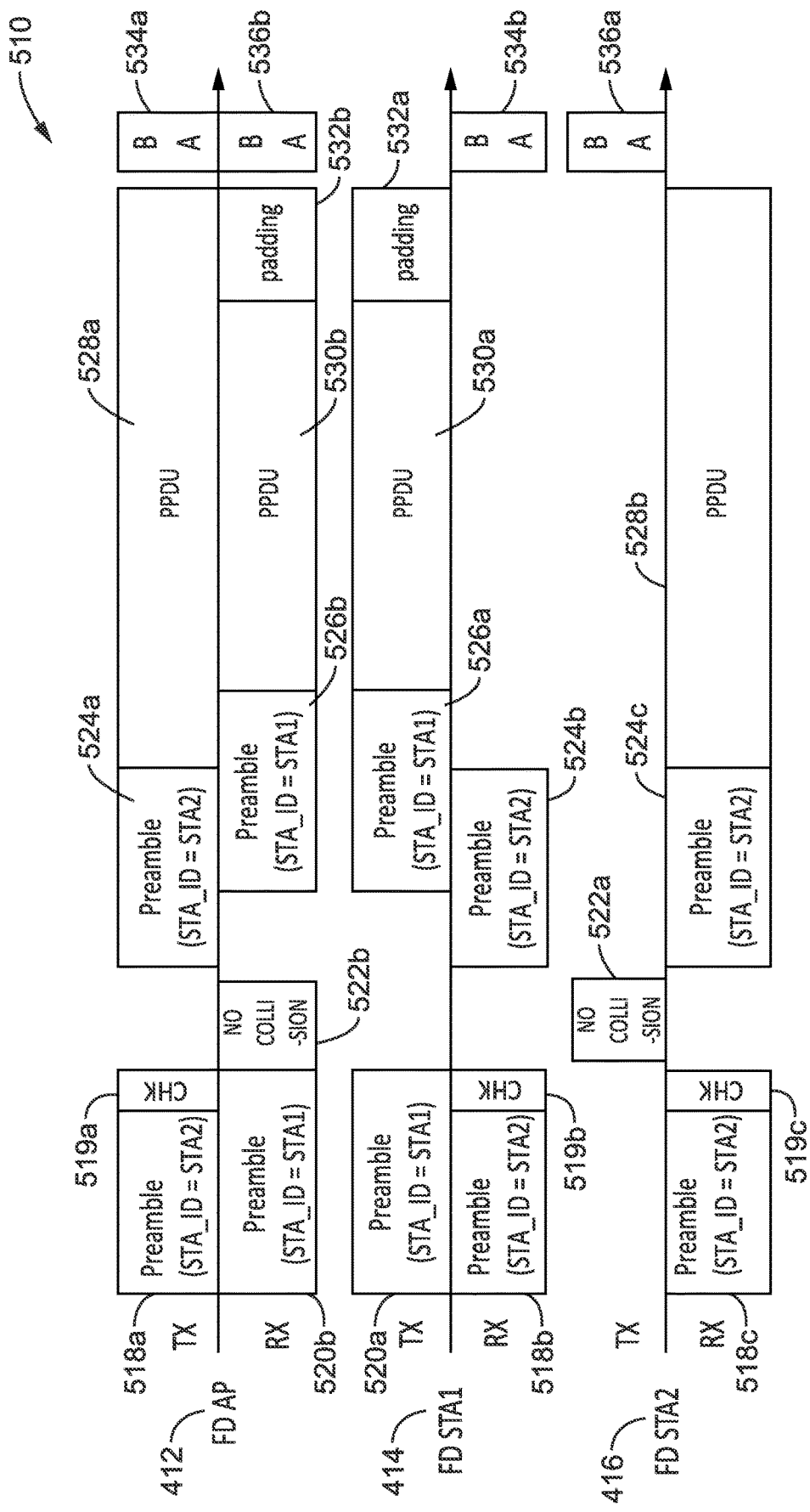
FIG. 19 is a communication diagram of overestimated collision improvement with a check setup in the preamble, according to at least one embodiment of the present disclosure.

FIG. 19 illustrates an example embodiment 510 of an overestimated collision improvement with a check setup in the preamble. It should be noted that example 4 is using a different collision protection protocol than that in example 2 and 3 above. This example is based on topology 2 as introduced before.

AP 412 and STA1 414 are FD devices and STA2 416 can be either a FD or non-FD device. AP and STA1, AP and STA2 are within the communication range of each other, although STA1 and STA2 are not in range of each other and thus cannot receive each other's transmissions.

The FD AP is transmitting a DL (UL/DL=0) PPDU to STA2 indicating STA_ID=STA2 in the FD preamble 518a. FD AP may also setup a check bit 519a in this FD preamble 518a. If destination STA2 receiving the preamble 518c detects the check bit 519c, then STA2 should respond with a signal to the FD AP. The AP should stop transmission after detecting a "real collision" and resume a retransmission after receiving the response from the destination STA.

FD STA1 is transmitting UL (UL/DL=1) PPDU to AP indicating STA_ID=STA1 in the FD preamble 520a, which is received 520b by the AP. FD STA1 receives FD preamble 518b from the AP which indicates STA_ID=STA2, and recognizes there may be a collision on STA2, and immediately discontinues (stops) transmission. STA1 detects the check bit 519b in the FD preamble, and it will wait to detect a signal that indicates collision or a resumed transmission from the colliding source, which is the AP.

The AP has sent preamble 518a which STA2 successfully receives 518c from the AP which has set the STA_ID=STA2 and detects the check bit is set, thus STA2 should send a signal 522a, which is received 522b by the AP indicating to the AP that STA2 has successfully received the preamble without collision.

The FD AP at first receives the FD preamble 520b from STA1 indicating STA_ID=STA1, and recognizes that there may be a collision on STA2, and it may discontinue transmitting the PPDU. Then, STA2 sends signal 522a, which is received 522b by the FD AP indicating there is no collision on STA2, and the AP resumes the retransmission of the PPDU.

FD STA1 does not receive any signal from STA2 indicating the collision and also hears the AP resuming the retransmission of the PPDU, and thus recognizes that there is no collision on STA2. In this case, FD STA1 may also retransmit the PPDU.

The example illustrates FD AP transmission of preamble 524a, which is received 524b, 524c at STA1 and STA2, and is followed by PPDU 528a, shown received 528b by STA2. STA1 is seen transmitting preamble 526a, PPDU 530a and padding 532a, which are all seen being received 526b, 530b and 532b by the AP. BAs are shown being sent, BA 536a from STA2 is received 536b by the AP, and BA 534a from the AP is received 534b by STA1.

It should be noted that, as shown in this example, the duration of the PPDU from STA1 to the AP shall be the same as that from AP to STA2, since the AP cannot respond with a BA to STA1 when it is still transmitting to STA2, or receiving a BA from STA2 when it is still receiving a PPDU from STA1. Thus, the PPDU sources may need to pad the PPDU(s) to align end point(s) of the PPDUs from AP to STA2 and from STA1 to the AP. The length of the respective PPDU can be determined from the FD preamble.

6.4.5. Example 5—Real Collision Improvement w/Check

Figure 20:
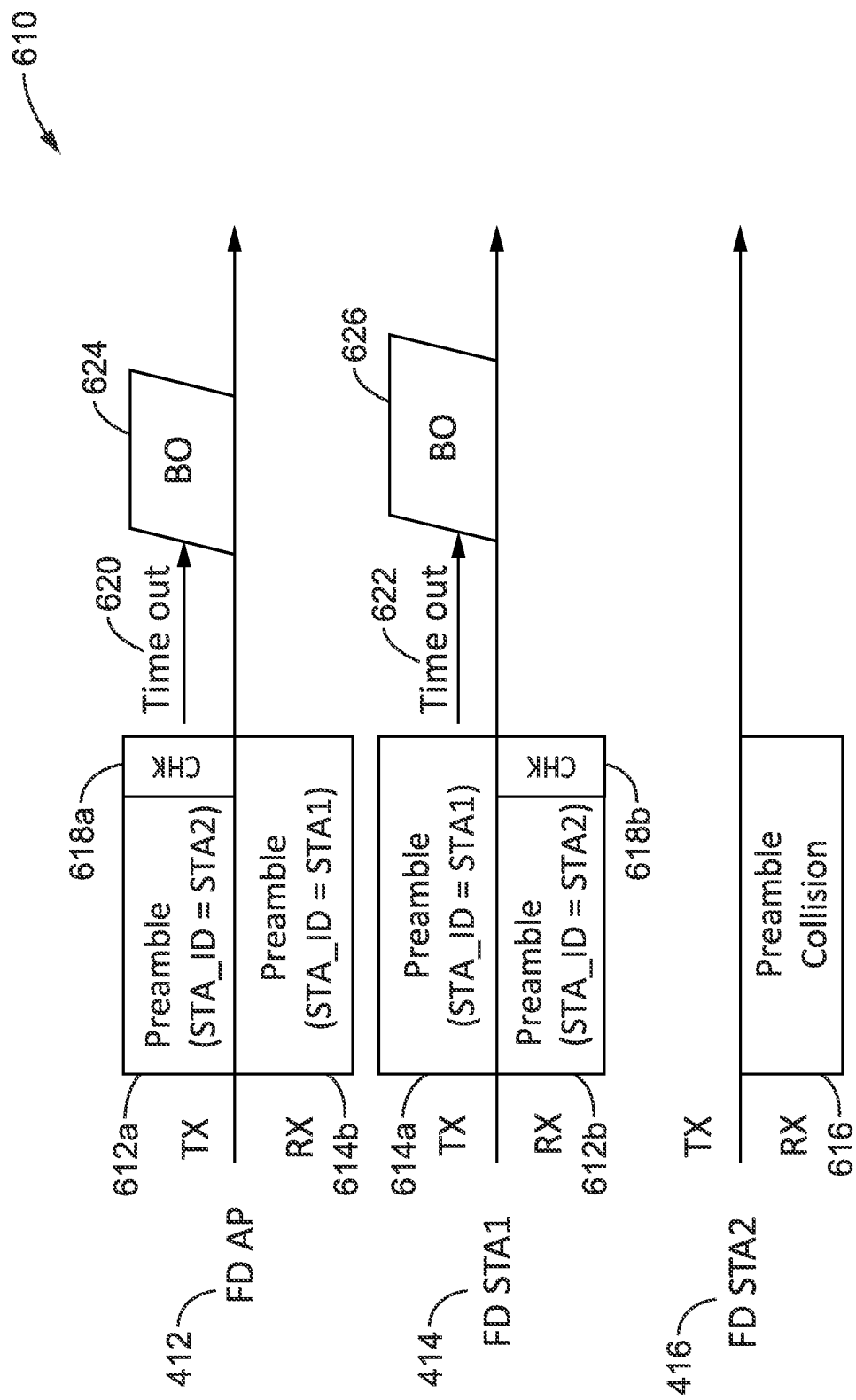
FIG. 20 is a communication diagram of using the same collision protection protocol as that of example 4, according to at least one embodiment of the present disclosure.

FIG. 20 illustrates an example embodiment 610 using the same collision protection protocol as that in example 4. This example is based on topology 2 as introduced before. AP 412 and STA1 414 are FD devices and STA2 416 can be either FD or non-FD device. AP and STA1, AP and STA2 are within communication range of each other, whereas STA1 and STA2 can hear each other.

The FD AP is transmitting DL (UL/DL=0) PPDU to STA2 indicating STA_ID=STA2 in the FD preamble 612a, which is received 612b by STA1. FD AP may also setup a check bit 618a in the FD preamble, for receipt 618b by STA1.

If the destination STA detects the check bit, it should respond by sending a signal to the FD AP, upon which the AP should stop transmission after detecting a collision, and then resume the retransmission after receiving the response from the destination STA.

FD STA1 is transmitting UL (UL/DL=1) PPDU to AP indicating STA_ID=STA1 in the FD preamble 614*a* for receipt 614*b* by the AP.

FD STA1 receives the FD preamble 612*b* from the AP indicating STA_ID=STA2, and recognizes there may be a collision on STA2, and it shall immediately stop transmission. STA1 detects the check bit 618*b* in the FD preamble, it will wait for detecting a signal that indicates a collision or a resumed transmission from the colliding source, which is AP.

FD AP receives the FD preamble 614*b* from STA1 indicating STA_ID=STA1, and recognizes there may be a collision 616 on STA2, and it shall immediately stop transmitting the PPDU.

STA2 receives the corrupted preambles 616, and will not respond.

The FD AP does not receive the signal from its destination STA2, and thus recognizes that there exists a real collision on STA2. The FD AP may then re-contend 624 for channel access after time out 620.

The FD STA1 does not receive any signal from STA2 indicating the collision and does not hear from the AP to resume the retransmission of the PPDU, and thus recognizes that there is a real collision on STA2. FD STA1 thus may re-contend 626 for channel access after time out 622.

6.4.6. Example 6—Fake Collision Resolution by Reallocation

Figure 21:
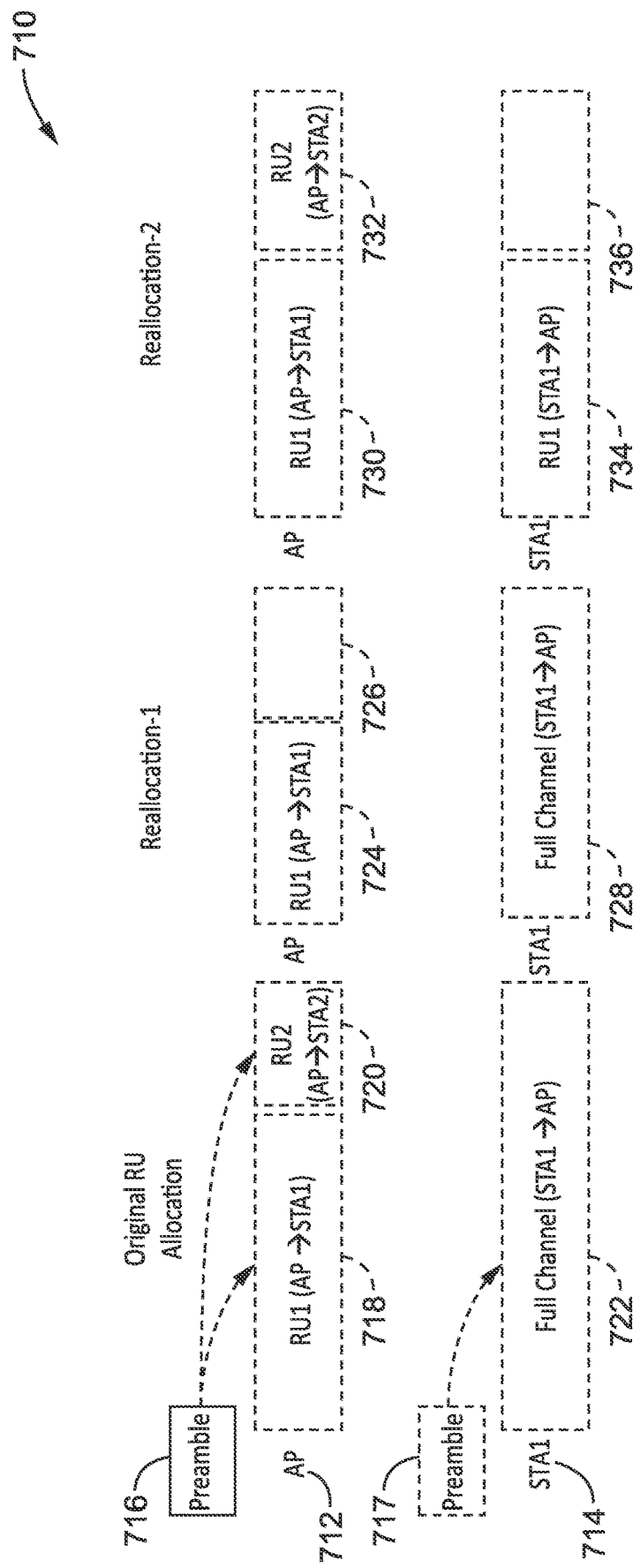
FIG. 21 is a communication diagram of fake collision resolving by reallocating the RU/MRU(s), according to at least one embodiment of the present disclosure.

FIG. 21 illustrates an example embodiment 710 of resolving a fake collision by reallocating the RU/MRU(s). The topology of this example is the same as Topology 2, which consists of one FD AP 712 and two FD non-AP STAs denoted as FD STA1 and FD STA2. It should be noted that this diagram is in a completely different format than the preceding figures.

In an original allocation, the AP sends DL FD MU PPDUs (signified by preamble 716) to STA1 (RU1) 718 and STA2 (RU2) 720. STA1 sends FD SU PPDU (signified by preamble 717) to the AP, it may carry CH information 722 with or without an RU index.

In the center of the figure is depicted a first possible reallocation (Reallocation-1) toward resolving the fake collision, in which the AP applies the relocated RU/MRU(s) 724, 726, while not utilizing RU2 724 for transmission to STA2, while STA1 maintains 728 the original RU allocation.

At the right of the figure is depicted a second possible reallocation (Reallocation-2) in which STA1 applies the relocated RU/MRU(s) 734, 736, and the AP maintains 730, 732, the original RU allocation.

Figure 22:
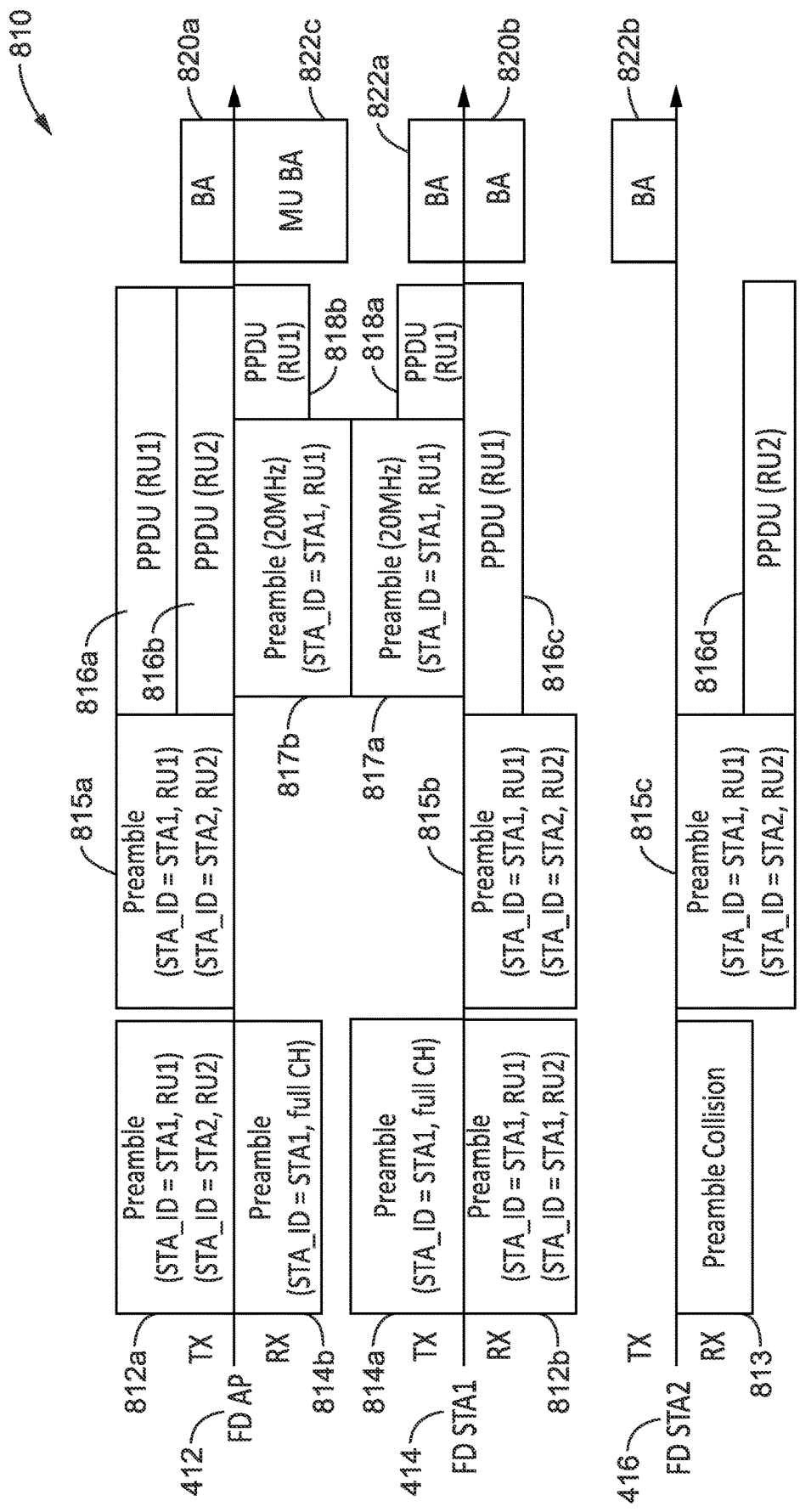
FIG. 22 is a communication diagram of a protocol for resolving a fake collision with reallocated RU(s), according to at least one embodiment of the present disclosure.

FIG. 22 illustrates an example embodiment 810 of a protocol for resolving a fake collision with reallocated RU(s). In the figure, FD AP 412, FD STA1 414 and FD STA2 416 are shown communicating.

FD AP is transmitting MU DL PPDU with preamble 812*a* indicating STA1, as specified by STA_ID is allocated with RU1; and STA2 is allocated with RU2. This preamble is shown received 812*b* at STA1, while a preamble collision 813 occurs at STA2.

FD STA1 is also transmitting a SU UL PPDU with preamble 814*a* indicating STA_ID as STA1 and will use the whole channel band to transmit the remainder of the PPDU. The FD AP receives 814*b* the preamble from STA1.

Thus, it is seen that the FD AP and FD STA1 are receiving the FD preambles from each other while transmitting. However, the FD preambles collide 813 at FD STA2.

Both the FD AP and FD STA1 recognize that this constitutes a fake collision in partial RU(s) when using the current RU allocation.

Accordingly, the FD AP retransmits a preamble after the "partial" fake collision detection and in the new preamble 815*a*, it indicates it will maintain the original RU allocation, or use a new RU allocation to avoid the fake collision. In this example, the FD AP maintains the original RU allocation, and this is received 815*b* by STA1. Following the FD preamble, the FD AP transmits PPDUs 816*a*, 816*b* which are received 816*c* by STA1 and 816*d* by STA2, using RU1 and RU2, respectively.

FD STA1 and FD STA2 successfully receive the new preamble 815*a* sent from FD AP, since FD AP maintains the original RU allocation, FD STA1 re-allocates the RUs to use only RU1 to transmit the remainder of the PPDU to FD AP for resolving the fake collision on RU1.

STA1 retransmits a new preamble 817*a* after finishing receiving the Preamble 815*a*, to avoid a real collision on the FD STA2 side. That new preamble is received 817*b* by the FD AP. It should be noted that the new preamble is using the primary 20 MHz channel which does not interfere with STA2 reception of RU2.

After FD STA1 sends the new FD preamble 817*a* to the FD AP, it continues sending PPDU 818*a* to be received 818*b* by the FD AP using RU1. At the same time, FD STA1 is receiving PPDU 816*c* from the AP on RU1.

The AP sends a BA response 820*a* to the received PPDU on RU1 from FD STA1, which is shown received 820*b* by STA1. FD STA1 and FD STA2 send BAs 822*a*, 822*b* as the responses to the received PPDUs on RU1 and RU2, respectively, from FD AP, and these BAs are shown received 822*c* as an MU BA by the FD AP.

7. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a station (STA), operating as an access point (AP) or non-AP STA, wirelessly communicating in full duplex (FD) mode with other STAs on a wireless local area network (WLAN) in an IEEE 802.11 protocol configured for supporting carrier sense multiple access/collision avoidance (CSMA/CA); (b) a processor of said STA; (c) a non-transitory memory storing instructions executable by the processor for communicating with other STAs and fulfilling different roles of a communications protocol; and (d) wherein said instructions, when executed by the processor, perform one or more steps of preamble-based collision detection comprising: (d)(i) incorporating STA identification and corresponding resource unit (RU) or multiple resource unit (MRU) information into FD preambles of physical layer protocol data units (PPDUs); (d)(ii) wherein when operating as a FD AP the STA indicates STA identification and corresponding RU/MRU index of a transmission destination in the FD preamble of a downlink (DL) PPDU; and (d)(iii) wherein when operating as a FD non-AP STA, the STA indicates its own STA identification and corresponding RU/MRU index in the FD preamble of a uplink (UL) PPDU.

An apparatus for wireless communication in a network, the apparatus comprising: (a) a wireless communication circuit, as a station (STA), operating as an access point (AP) or non-AP STA, wirelessly communicating in full duplex (FD) mode with other STAs on a wireless local area network (WLAN) in an IEEE 802.11 protocol configured for supporting carrier sense multiple access/collision avoidance (CSMA/CA); (b) a processor of said STA; (c) a non-transitory memory storing instructions executable by the processor for communicating with other STAs and fulfilling different roles of a communications protocol; and (d) wherein said instructions, when executed by the processor, perform one or more steps of preamble-based collision detection comprising: (d)(i) incorporating STA identification and corresponding resource unit (RU) or multiple resource unit (MRU) information into FD preambles of physical layer protocol data units (PPDUs); (d)(ii) wherein when operating as a FD AP the STA indicates STA identification and corresponding RU/MRU index of a transmission destination in the FD preamble of a downlink (DL) PPDU; (d)(iii) wherein when operating as a FD non-AP STA, the STA indicates its own STA identification and corresponding RU/MRU index in the FD preamble of a uplink (UL) PPDU; (d)(iv) wherein the FD AP detects a fake collision when it is simultaneous transmitting and receiving after successive interference cancellation (SIC) and detects that a received UL FD preamble has an identical STA identification as a STA identification transmitted in its DL FD preamble; and (d)(v) wherein the FD AP upon detecting the fake collision continues transmitting the remainder of the DL PPDU after detecting the fake collision.

An apparatus for wireless communication in a network, the apparatus comprising: (a) a wireless communication circuit, as a station (STA), operating as an access point (AP) or non-AP STA, wirelessly communicating in full duplex (FD) mode with other STAs on a wireless local area network (WLAN) in an IEEE 802.11 protocol configured for supporting carrier sense multiple access/collision avoidance (CSMA/CA); (b) a processor of said STA; (c) a non-transitory memory storing instructions executable by the processor for communicating with other STAs and fulfilling different roles of a communications protocol; and (d) wherein said instructions, when executed by the processor, perform one or more steps of preamble-based collision detection comprising: (d)(i) incorporating STA identification and corresponding resource unit (RU) or multiple resource unit (MRU) information into FD preambles of physical layer protocol data units (PPDUs); (d)(ii) wherein when operating as a FD AP the STA indicates STA identification and corresponding RU/MRU index of a transmission destination in the FD preamble of a downlink (DL) PPDU; (d)(iii) wherein when operating as a FD non-AP STA, the STA indicates its own STA identification and corresponding RU/MRU index in the FD preamble of a uplink (UL) PPDU; (d)(iv) wherein the FD AP detects a partial RU fake collision in response to which it transmits and receives at the same time after SIC and detects from the received UL FD preamble that indicates the same STA identification as the STA identification in its transmitted DL FD preamble, and with the RU/MRU index as indicated in the received UL FD preamble that has the same subset of the RU/MRU index as the STA indicated in its transmitted DL FD preamble; and (d)(v) wherein upon detecting said partial RU fake collision, the FD AP stops transmitting the remainder of the PPDU, and afterward retransmits the preamble.

A method of performing wireless communication in a network, comprising: (a) operating a wireless communication circuit as a station (STA) as an access point (AP) or non-AP STA, wirelessly communicating in full duplex (FD) mode with other STAs on a wireless local area network (WLAN) in an IEEE 802.11 protocol configured for supporting carrier sense multiple access/collision avoidance (CSMA/CA); (b) performing preamble-based collision detection; (c) incorporating STA identification and corresponding resource unit (RU) or multiple resource unit (MRU) information into FD preambles of physical layer protocol data units (PPDUs); (d) wherein when operating as a FD AP the STA indicates STA identification and corresponding RU/MRU index of a transmission destination in the FD preamble of a downlink (DL) PPDU; and (e) wherein when operating as a FD non-AP STA, the STA indicates its own STA identification and corresponding RU/MRU index in the FD preamble of a uplink (UL) PPDU.

A wireless protocol in which STA_ID and the corresponding RU/MRU information are carried in the new FD preambles; (a) FD AP shall indicate the STA_ID and the corresponding RU/MRU index of the destination in the FD preamble of the DL PPDU; (b) FD non-AP STA shall indicate its own STA_ID and the corresponding RU/MRU index in the FD preamble of UL PPDU.

The apparatus or method of any preceding implementation, wherein the FD AP detects a fake collision when it is simultaneous transmitting and receiving after successive interference cancellation (SIC) and detects from a received UL FD preamble an identical STA identification to the STA identification transmitted in its DL FD preamble; and wherein the FD AP upon detecting the fake collision continues transmitting the remainder of the DL PPDU after detecting the fake collision.

The apparatus or method of any preceding implementation, wherein the FD AP detects a partial RU fake collision when it is simultaneous transmitting and receiving after successive interference cancellation (SIC) and detects from the received UL FD preamble an identical STA identification as the STA identification in its transmitted DL FD preamble, and with the RU/MRU index as indicated in the received UL FD preamble that has the same subset of the RU/MRU index as the STA indicated in its transmitted DL FD preamble; and wherein upon detecting said partial RU fake collision, the FD AP discontinues transmitting the remainder of the PPDU, then afterward retransmits the preamble.

The apparatus or method of any preceding implementation, wherein the retransmitted preamble indicates if the FD AP is to maintain an originally sent RU allocation, or utilize a new RU allocation to avoid fake collisions.

The apparatus or method of any preceding implementation, wherein the retransmitted preamble is required to use at least the primary 20 MHz channel and shall not interfere with another non-AP STA's reception.

The apparatus or method of any preceding implementation, wherein the FD AP detects a real collision when it transmits and receives at the same time after SIC and detects from the received UL FD preamble indicating a different STA identification than was sent in the transmitted DL FD preamble.

The apparatus or method of any preceding implementation, wherein the FD AP immediately discontinues transmitting the remainder of the DL PPDU, and retransmits the PPDU without the need to check collision status.

The apparatus or method of any preceding implementation, wherein the FD AP requests to check the collision status in the preamble and retransmits the PPDU when it is determined the collision is not real.

The apparatus or method of any preceding implementation, wherein the FD AP sets a check bit in the FD preamble to request that the destination DL STA send a signal on the collision status in response of a received FD preamble; and wherein if the FD AP receives signaling from the DL destination STA indicating there is no collision on that STA, then the FD AP resumes transmitting the remainder of the PPDU.

The apparatus or method of any preceding implementation, wherein if the FD non-AP STA receives an AP preamble with a check bit set but does not receive any signal from the destination that indicates a collision, and if the FD non-AP STA recognizes that the AP has resumed retransmission of the PPDU, then the FD non-AP STA resumes retransmitting the PPDU.

The apparatus or method of any preceding implementation, wherein the resumed PPDU to the FD AP is end point aligned with the concurrent PPDU from the AP to another non-AP STA.

The apparatus or method of any preceding implementation, wherein an FD STA that is not transmitting, but which receives corrupted preambles should not respond; and wherein if the FD STA successfully receives a DL FD preamble with a STA identification addressed to itself, and detects a check bit is setup, then it responds to the associated AP to indicate it has successfully received the FD preamble from the AP.

The apparatus or method of any preceding implementation, wherein if a fake collision occurs when the FD non-AP STA is transmitting and receiving at the same time after successive interference cancellation (SIC) and detects from the received DL FD preamble an indication that the STA_ID is identical to the STA_ID in its transmitted UL FD preamble, then the FD non-AP STA continues transmitting the remainder of the PPDU to the FD AP.

The apparatus or method of any preceding implementation, wherein if the FD non-AP STA detects a fake collision on a portion of the resource units (RUs), then it stops transmitting the remainder of the PPDU and retransmits the preamble; wherein the FD non-AP STA retransmits a new preamble after finishing receiving the Preamble from the FD AP; wherein the retransmitted new preamble indicates whether the non-AP STA maintains or re-allocates the RU(s) to transmit the remainder of the PPDU to resolve the fake collision; and wherein the retransmission of the new preamble uses at least the primary 20 MHz channel and shall not interfere with reception at another non-AP STA.

The apparatus or method of any preceding implementation, wherein if the FD non-AP STA detects a real collision as detected when it transmits and receives at the same time after SIC, and finds the received DL FD preamble indicating a different STA identification than the STA identification in its transmitted UL FD preamble then, the FD non-AP performs steps comprising: (a) wherein the FD non-AP STA immediately discontinues transmission; (b) wherein if the FD non-AP STA receives an AP preamble with a check bit setup, but it does not receive any signal from the destination of the AP that indicates a collision, and if the FD non-AP STA recognizes that the AP has resumed retransmission of the PPDU, then the FD non-AP STA then resumes retransmitting the PPDU; and (c) wherein the resumed PPDU transmitted to the AP is end point aligned with the concurrent PPDU from the AP to another non-AP STA.

The apparatus or method of any preceding implementation, wherein the FD AP detects a "fake collision" should not stop transmitting the remainder of DL PPDU after detecting the "fake collision"; (a) The "fake collision" occurs when it transmits and receives at the same time after SIC and detects from the received UL FD preamble that indicates the same STA_ID as the STA_ID in its transmitted DL FD preamble.

The apparatus or method of any preceding implementation, wherein the FD AP detects a "partial RU fake collision" and stops transmitting the remainder of the PPDU, then retransmits the preamble; (a) The retransmitted preamble indicates if it maintains the original RU allocation, or if it uses a new RU allocation to avoid the fake collision.

The apparatus or method of any preceding implementation, wherein the FD AP detect a "real collision" when it transmits and receives at the same time after SIC and detects from the received UL FD preamble which indicates the different STA_ID as the STA_ID in its transmitted DL FD preamble; (a) the FD AP retransmits the PPDU w/o requiring to check the collision status; (a)(i) if the FD AP detects a "real collision" should immediately stop transmitting the remainder of the DL PPDU; (ii) if the FD AP detects a "real collision" it should retransmit the PPDU once the receiving colliding preamble has been terminated, and AP has not received any signaling from the destination non-AP STA; (b) FD AP requests to check the collision status in the preamble and retransmit the PPDU when it is determined the collision is not real; (b)(i) FD AP detecting a "real collision" should immediately stop transmitting the remainder of the DL PPDU; (b)(ii) FD AP may set a check bit in the FD preamble to request the destination DL STA to send a signal on the collision status as the response of the received FD preamble; (iii) If FD AP receives signaling from the DL destinated STA indicating there is no collision on that STA, the FD AP may resume transmitting the remainder of the PPDU that may be with or without a duplicate transmission of the preamble.

The apparatus or method of any preceding implementation, wherein if FD the non-AP STA detects a "fake collision" it shall continue transmitting the remainder of the PPDU to the FD AP; (a) if the "fake collision" occurs when it is transmitting and receiving at the same time after SIC, and detects from the received DL FD preamble indicating the same STA_ID as the STA_ID in its transmitted UL FD preamble.

The apparatus or method of any preceding implementation, wherein if the FD non-AP STA detects a "partial RU fake collision", it stops transmitting the remainder of the PPDU and retransmits the preamble; (a) the non-AP STA should retransmit a new preamble after finishing receiving the Preamble from AP; (b) the retransmitted new preamble indicates if the non-AP STA maintain or re-allocate the RU(s) to transmit the remainder of the PPDU to resolving fake collision; (c) The retransmission of the new preamble is required to use at least the primary 20 MHz channel and shall not interfere with another non-AP STA's reception.

The apparatus or method of any preceding implementation, wherein if FD non-AP STA detects a "real collision" when it transmits and receives at the same time after SIC, and detects from the received DL FD preamble indicating a different STA_ID than the STA_ID in its transmitted UL FD preamble then; (a) if the FD non-AP STA detects a "real collision" it shall immediately stop transmission; (b) If the FD non-AP STA receives an AP preamble with a check bit setup but doesn't receive any signal from the destination of the AP that indicates a collision, and if FD non-AP STA recognizes that the AP has resumed retransmission of the PPDU, then the FD non-AP STA may resume retransmitting the PPDU; (c) the resumed PPDU to the AP needs to be end point aligned with the concurrent PPDU from AP to another non-AP STA.

The apparatus or method of any preceding implementation, wherein the FD STA that is not transmitting, but which receives corrupted preambles should not respond; otherwise, if the FD STA successfully receives DL FD preamble with a STA_ID addressed to itself and detect a check bit is setup, it should respond to the associated AP to indicate it has successfully received the FD preamble from AP.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
    (a) a wireless communication circuit, as a station (STA), operating as an access point (AP) or non-AP STA, wirelessly communicating in full duplex (FD) mode with other STAs on a wireless local area network (WLAN) in an IEEE 802.11 protocol configured for supporting carrier sense multiple access/collision avoidance (CSMA/CA);
    (b) a processor of said STA;
    (c) a non-transitory memory storing instructions executable by the processor for communicating with other STAs and fulfilling different roles of a communications protocol; and
    (d) wherein said instructions, when executed by the processor, perform one or more steps of preamble-based collision detection comprising:
        (i) incorporating STA identification and corresponding resource unit (RU) or multiple resource unit (MRU) information into FD preambles of physical layer protocol data units (PPDUs);
        (ii) wherein when operating as a FD AP the STA indicates STA identification and corresponding RU/MRU index of a transmission destination in the FD preamble of a downlink (DL) PPDU; and
        (iii) wherein when operating as a FD non-AP STA, the STA indicates its own STA identification and corresponding RU/MRU index in the FD preamble of a uplink (UL) PPDU.

2. The apparatus of claim 1:
    wherein the FD AP detects a fake collision when it is simultaneous transmitting and receiving after successive interference cancellation (SIC) and detects from a received UL FD preamble an identical STA identification to the STA identification transmitted in its DL FD preamble; and
    wherein the FD AP upon detecting the fake collision continues transmitting the remainder of the DL PPDU after detecting the fake collision.

3. The apparatus of claim 1:
    wherein the FD AP detects a partial RU fake collision when it is simultaneous transmitting and receiving after successive interference cancellation (SIC) and detects from the received UL FD preamble an identical STA identification as the STA identification in its transmitted DL FD preamble, and with the RU/MRU index as indicated in the received UL FD preamble that has the same subset of the RU/MRU index as the STA indicated in its transmitted DL FD preamble; and wherein upon detecting said partial RU fake collision, the FD AP discontinues transmitting the remainder of the PPDU, then afterward retransmits the preamble.

4. The apparatus of claim 3, wherein the retransmitted preamble indicates if the FD AP is to maintain an originally sent RU allocation, or utilize a new RU allocation to avoid fake collisions.

5. The apparatus of claim 4, wherein the retransmitted preamble is required to use at least the primary 20 MHz channel and shall not interfere with another non-AP STA's reception.

6. The apparatus of claim 1, wherein the FD AP detects a real collision when it transmits and receives at the same time after SIC and detects from the received UL FD preamble indicating a different STA identification than was sent in the transmitted DL FD preamble.

7. The apparatus of claim 6, wherein the FD AP immediately discontinues transmitting the remainder of the DL PPDU, and retransmits the PPDU without the need to check collision status.

8. The apparatus of claim 6, wherein the FD AP requests to check the collision status in the preamble and retransmits the PPDU when it is determined the collision is not real.

9. The apparatus of claim 6:
wherein the FD AP sets a check bit in the FD preamble to request that the destination DL STA send a signal on the collision status in response of a received FD preamble; and
wherein if the FD AP receives signaling from the DL destination STA indicating there is no collision on that STA, then the FD AP resumes transmitting the remainder of the PPDU.

10. The apparatus of claim 6, wherein if the FD non-AP STA receives an AP preamble with a check bit set but does not receive any signal from the destination that indicates a collision, and if the FD non-AP STA recognizes that the AP has resumed retransmission of the PPDU, then the FD non-AP STA resumes retransmitting the PPDU.

11. The apparatus of claim 10, wherein the resumed PPDU to the FD AP is end point aligned with the concurrent PPDU from the AP to another non-AP STA.

12. The apparatus of claim 1:
wherein an FD STA that is not transmitting, but which receives corrupted preambles should not respond;
wherein if the FD STA successfully receives a DL FD preamble with a STA identification addressed to itself, and detects a check bit is setup, then it responds to the associated AP to indicate it has successfully received the FD preamble from the AP.

13. The apparatus of claim 1, wherein if a fake collision occurs when the FD non-AP STA is transmitting and receiving at the same time after successive interference cancellation (SIC) and detects from the received DL FD preamble an indication that the STA ID is identical to the STA_ID in its transmitted UL FD preamble, then the FD non-AP STA continues transmitting the remainder of the PPDU to the FD AP.

14. The apparatus of claim 1:
wherein if the FD non-AP STA detects a fake collision on a portion of the resource units (RUs), then it stops transmitting the remainder of the PPDU and retransmits the preamble;
wherein the FD non-AP STA retransmits a new preamble after finishing receiving the Preamble from the FD AP;
wherein the retransmitted new preamble indicates whether the non-AP STA maintains or re-allocates the RU(s) to transmit the remainder of the PPDU to resolve the fake collision; and
wherein the retransmission of the new preamble uses at least the primary 20 MHz channel and shall not interfere with reception at another non-AP STA.

15. The apparatus of claim 1:
wherein if the FD non-AP STA detects a real collision as detected when it transmits and receives at the same time after SIC, and finds the received DL FD preamble indicating a different STA identification than the STA identification in its transmitted UL FD preamble then, the FD non-AP performs steps comprising:
(a) wherein the FD non-AP STA immediately discontinues transmission;
(b) wherein if the FD non-AP STA receives an AP preamble with a check bit setup, but it does not receive any signal from the destination of the AP that indicates a collision, and if the FD non-AP STA recognizes that the AP has resumed retransmission of the PPDU, then the FD non-AP STA then resumes retransmitting the PPDU; and
(c) wherein the resumed PPDU transmitted to the AP is end point aligned with the concurrent PPDU from the AP to another non-AP STA.

16. An apparatus for wireless communication in a network, the apparatus comprising:
(a) a wireless communication circuit, as a station (STA), operating as an access point (AP) or non-AP STA, wirelessly communicating in full duplex (FD) mode with other STAs on a wireless local area network (WLAN) in an IEEE 802.11 protocol configured for supporting carrier sense multiple access/collision avoidance (CSMA/CA);
(b) a processor of said STA;
(c) a non-transitory memory storing instructions executable by the processor for communicating with other STAs and fulfilling different roles of a communications protocol; and
(d) wherein said instructions, when executed by the processor, perform one or more steps of preamble-based collision detection comprising:
(i) incorporating STA identification and corresponding resource unit (RU) or multiple resource unit (MRU) information into FD preambles of physical layer protocol data units (PPDUs);
(ii) wherein when operating as a FD AP the STA indicates STA identification and corresponding RU/MRU index of a transmission destination in the FD preamble of a downlink (DL) PPDU;
(iii) wherein when operating as a FD non-AP STA, the STA indicates its own STA identification and corresponding RU/MRU index in the FD preamble of a uplink (UL) PPDU;
(iv) wherein the FD AP detects a fake collision when it is simultaneous transmitting and receiving after successive interference cancellation (SIC) and detects that a received UL FD preamble has an identical STA identification as a STA identification transmitted in its DL FD preamble; and
(v) wherein the FD AP upon detecting the fake collision continues transmitting the remainder of the DL PPDU after detecting the fake collision.

17. An apparatus for wireless communication in a network, the apparatus comprising:

(a) a wireless communication circuit, as a station (STA), operating as an access point (AP) or non-AP STA, wirelessly communicating in full duplex (FD) mode with other STAs on a wireless local area network (WLAN) in an IEEE 802.11 protocol configured for supporting carrier sense multiple access/collision avoidance (CSMA/CA);
(b) a processor of said STA;
(c) a non-transitory memory storing instructions executable by the processor for communicating with other STAs and fulfilling different roles of a communications protocol; and
(d) wherein said instructions, when executed by the processor, perform one or more steps of preamble-based collision detection comprising:
  (i) incorporating STA identification and corresponding resource unit (RU) or multiple resource unit (MRU) information into FD preambles of physical layer protocol data units (PPDUs);
  (ii) wherein when operating as a FD AP the STA indicates STA identification and corresponding RU/MRU index of a transmission destination in the FD preamble of a downlink (DL) PPDU;
  (iii) wherein when operating as a FD non-AP STA, the STA indicates its own STA identification and corresponding RU/MRU index in the FD preamble of a uplink (UL) PPDU;
  (iv) wherein the FD AP detects a partial RU fake collision in response to which it transmits and receives at the same time after SIC and detects from the received UL FD preamble that indicates the same STA identification as the STA identification in its transmitted DL FD preamble, and with the RU/MRU index as indicated in the received UL FD preamble that has the same subset of the RU/MRU index as the STA indicated in its transmitted DL FD preamble; and
  (v) wherein upon detecting said partial RU fake collision, the FD AP stops transmitting the remainder of the PPDU, and afterward retransmits the preamble.

18. A method of performing wireless communication in a network, comprising:
(a) operating a wireless communication circuit as a station (STA) as an access point (AP) or non-AP STA, wirelessly communicating in full duplex (FD) mode with other STAs on a wireless local area network (WLAN) in an IEEE 802.11 protocol configured for supporting carrier sense multiple access/collision avoidance (CSMA/CA);
(b) performing preamble-based collision detection;
(c) incorporating STA identification and corresponding resource unit (RU) or multiple resource unit (MRU) information into FD preambles of physical layer protocol data units (PPDUs);
(d) wherein when operating as a FD AP the STA indicates STA identification and corresponding RU/MRU index of a transmission destination in the FD preamble of a downlink (DL) PPDU; and
(e) wherein when operating as a FD non-AP STA, the STA indicates its own STA identification and corresponding RU/MRU index in the FD preamble of a uplink (UL) PPDU.

* * * * *